(12) United States Patent
Whittum et al.

(10) Patent No.: US 10,314,151 B2
(45) Date of Patent: *Jun. 4, 2019

(54) CHARGED PARTICLE ACCELERATORS, RADIATION SOURCES, SYSTEMS, AND METHODS

(71) Applicant: Varex Imaging Corporation, Salt Lake City, UT (US)

(72) Inventors: David Whittum, Sunnyvale, CA (US); James E. Clayton, San Jose, CA (US); George Merdinian, Los Altos, CA (US)

(73) Assignee: Varex Imaging Corporation, Salt Lake City, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/710,202

(22) Filed: May 12, 2015

(65) Prior Publication Data
US 2016/0345418 A1    Nov. 24, 2016

Related U.S. Application Data

(63) Continuation of application No. 13/366,963, filed on Feb. 6, 2012, now Pat. No. 9,030,134, which is a
(Continued)

(51) Int. Cl.
*H05H 9/00* (2006.01)
*H05G 1/04* (2006.01)
(Continued)

(52) U.S. Cl.
CPC ............. *H05G 1/04* (2013.01); *G01V 5/0016* (2013.01); *H01J 35/02* (2013.01); *H05G 1/025* (2013.01);
(Continued)

(58) Field of Classification Search
CPC ............................. H05H 9/04; H01J 2235/08
(Continued)

(56) References Cited

U.S. PATENT DOCUMENTS 2,880,337 A * 3/1959 Marrison ............... B24C 5/08
                                                        164/DIG. 4
3,229,130 A * 1/1966 Drouard ............... C08B 11/04
                                                        310/54
(Continued)

FOREIGN PATENT DOCUMENTS

EP    0 673 187 A1    9/1995
JP    2006/239070     9/2006

OTHER PUBLICATIONS

Russell G. Schonberg; "The History of the Portable Linear Accelerator", The American Association of Physicists in Medicine, Annual Meeting, 2001. Available at: http://www.aapm.org/meetings/2001AM/pdf/7221-68900.pdf.
(Continued)

*Primary Examiner* — Tung X Le
(74) *Attorney, Agent, or Firm* — Brandon N. Sklar; Cozen O'Connor

(57) ABSTRACT

Man-portable radiation generation sources and systems that may be carried by hand to a site of interest by one or two people, are disclosed. Methods of use of such sources and systems are also disclosed. Battery operated radiation generation sources, air cooled radiation generation sources, and charged particle accelerators, are also disclosed. A radiation generation source, a radiation scanning system, and a target assembly comprising target material having a thickness of less than 0.20 mm are also disclosed.

28 Claims, 15 Drawing Sheets

Related U.S. Application Data continuation of application No. 12/287,792, filed on Oct. 14, 2008, now Pat. No. 8,111,025.

(60) Provisional application No. 61/007,500, filed on Dec. 13, 2007, provisional application No. 60/998,691, filed on Oct. 12, 2007.

(51) Int. Cl.
    *H05H 9/04*     (2006.01)
    *G01V 5/00*     (2006.01)
    *H01J 35/02*     (2006.01)
    *H05G 1/02*     (2006.01)
    *H05G 1/10*     (2006.01)

(52) U.S. Cl.
    CPC ............... *H05G 1/10* (2013.01); *H05H 9/04* (2013.01); *H01J 2235/08* (2013.01)

(58) Field of Classification Search
    USPC ........................................ 315/5.39, 505, 506
    See application file for complete search history.

(56) References Cited

U.S. PATENT DOCUMENTS

| | | | |
|---|---|---|---|
| 3,612,919 A * | 10/1971 | Herb | H02N 1/08 310/309 |
| 3,965,434 A | 6/1976 | Helgesson | |
| 4,139,777 A * | 2/1979 | Rautenbach | A61N 5/10 376/112 |
| 4,389,572 A | 6/1983 | Hutcheon | |
| 4,392,080 A | 7/1983 | Maschke | |
| 4,425,506 A | 1/1984 | Brown et al. | |
| 4,531,639 A * | 7/1985 | Zopf | B65D 81/022 206/3 |
| 4,610,021 A | 9/1986 | Peschmann et al. | |
| 4,797,907 A | 1/1989 | Anderton | |
| 4,988,919 A | 1/1991 | Tanabe et al. | |
| 5,251,240 A | 10/1993 | Grodzins | |
| 5,313,511 A | 5/1994 | Annis et al. | |
| 5,321,271 A * | 6/1994 | Schonberg | A61N 5/01 250/492.3 |
| 5,451,847 A | 9/1995 | Nakanishi | |
| 5,744,919 A | 4/1998 | Mishin et al. | |
| 5,801,488 A | 9/1998 | Fujisawa | |
| 5,825,140 A | 10/1998 | Fujisawa | |
| 5,870,447 A | 2/1999 | Powell et al. | |
| 5,968,401 A | 10/1999 | Roy | |
| 6,169,782 B1 | 1/2001 | Zetterlund | |
| 6,316,876 B1 | 11/2001 | Tanabe | |
| 6,407,505 B1 | 6/2002 | Bertsche | |
| 6,445,766 B1 | 9/2002 | Whitham | |
| 6,487,274 B2 | 11/2002 | Bertsche | |
| 6,642,678 B1 | 11/2003 | Allen et al. | |
| 6,822,250 B2 | 11/2004 | Korenev | |
| 6,864,633 B2 | 3/2005 | Trail et al. | |
| 6,954,515 B2 | 10/2005 | Bjorkholm et al. | |
| 7,239,095 B2 | 7/2007 | Ho et al. | |
| 7,265,356 B2 | 9/2007 | Pelizzari et al. | |
| 7,339,320 B1 | 3/2008 | Meddaugh et al. | |
| 7,345,435 B1 | 3/2008 | Sekutowicz et al. | |
| 7,496,178 B2 | 2/2009 | Turner | |
| 7,554,275 B2 | 6/2009 | Amaldi | |
| 7,639,785 B2 | 12/2009 | Kirshner et al. | |
| 7,646,841 B2 | 1/2010 | Moon et al. | |
| 7,728,311 B2 * | 6/2010 | Gall | A61N 5/1081 250/396 R |
| 8,198,587 B2 | 6/2012 | Whittum et al. | |
| 2002/0122531 A1 | 9/2002 | Whitham | |
| 2002/0191747 A1 | 12/2002 | Sato | |
| 2004/0131150 A1 * | 7/2004 | Pankratov | A61N 5/10 378/65 |
| 2004/0232415 A1 | 11/2004 | Aoki et al. | |
| 2005/0078796 A1 | 4/2005 | Leek | |
| 2005/0134203 A1 | 6/2005 | Salop et al. | |
| 2005/0213711 A1 | 9/2005 | Ukita | |
| 2005/0222499 A1 | 10/2005 | Banik et al. | |
| 2006/0006809 A1 * | 1/2006 | Whitham | H05H 7/18 315/111.61 |
| 2006/0008052 A1 | 1/2006 | Elyan et al. | |
| 2006/0120512 A1 * | 6/2006 | Watanabe | A61B 6/4405 378/198 |
| 2006/0140326 A1 | 6/2006 | Rowland et al. | |
| 2006/0256914 A1 * | 11/2006 | Might | G01N 23/04 378/57 |
| 2007/0018111 A1 * | 1/2007 | Calderon | A61N 5/1049 250/393 |
| 2007/0018117 A1 | 1/2007 | Calderon et al. | |
| 2007/0164238 A1 | 7/2007 | Pomper | |
| 2008/0014643 A1 | 1/2008 | Bjorkholm | |
| 2008/0192899 A1 | 8/2008 | Kump et al. | |
| 2009/0026123 A1 * | 1/2009 | Dolecek | A61L 24/106 210/207 |
| 2009/0041197 A1 | 2/2009 | Clayton | |
| 2009/0096179 A1 * | 4/2009 | Stark | A61N 5/10 280/47.34 |
| 2009/0140671 A1 * | 6/2009 | O'Neal, III | H03L 7/00 315/502 |

OTHER PUBLICATIONS

Andrey V. Mishin; "Portable Linear Accelerators For Commercial Applications", Prepared for Publication in the Proceedings of Electron Beam Curing of Composites Workshop, Oak Ridge, Tennessee, Sep. 10-11, 1997.

Xiang et al; "A Protable X-Band On-Axis Standing Wave Linac Structure", Proceedings of the 17$^{th}$ 1997 IEEE Particle Accelerator Conference. May 12-16, 1997 p. 1221-1223; Vancouver, British Columbia, Canada. Available at: http://epaper.kek.jp/pac97/papers/pdf/9W036.PDF.

D.A. Zavadtsev et al: "Compact Electron Linear Accelerator Relus-5 For Radiation Technology Application", Proceedings of EPAC 2006; pp. 2385-2387; Edinburgh, Scotland, Available at: http://accelconf.web.cern.ch/AccelConf/e06/PAPERS/WEPCH192.PDF.

Xiang et al; "RF Phase Focusing and Asymmetric Field Shape in Standing-wave Electron Linacs", Department of Engineering Physics, Supported by the National Science Foundation of China; Asian Particle Accelerator Conference 1998, Beijing, China. Available at: http://accelconf.web.cern.ch/AccelConf/a98/4D041.PDFPAC98/40)41.PDF.

Hill et al; "High-gradient millimeter-wave accelerator on a planar dielectric substrate"; Physical Review Letters, vol. 87, Issue 9; Oct. 26, 2000. Available at: http://www.slac.stanford.edu/cgi-wrap/getdoc/slac-pub-8680.pdf.

Hill et al; "Beam-Cavity Interaction Circuit at W-Band"; Published in IEEE Transactions on Microwave Theory and Techniques, vol. 49, Issue 5; Sep. 2000. Available at: http://www.slac.stanford.edu/cgi-wrap/getdoc/slac-pub-8186.pdf.

Hill et al; "Planar Dielectric Accelerator Structures at W-Band"; Published in Review of Scientific Instruments; Oct. 2000. Available at: http://www.slac.stanford.edu/cgi-wrap/getdoc/slac-pub-8666.pdf.

"Varian's Linatron-MP: The Portable System" for Field Radiography, Varian Medical Systems Technology, Inc., 2003.

"Linatron®-M™ Modular high energy radiation source," Varian Medical Systems, Inc., Sep. 2007. Available at: http://www.varian.com/media/security_and_inspection/products/pdf/cargobrief.pdf.

"MINI Field Portable X-Ray Equipment," Varian Associates, Oct. 1997.

L. Begin et al., "Portable Linac using CW Magnetron as Power Source", pp. 743-745, American Physical Society, Particle Acceleration Meeting, May 12-16, 1997. Available at: http://accelconf.web.cern.ch/AccelConf/e98/PAPERS/MOP07J.PDS.

Yamamoto et al., "Compact 950 keV X-band (9.4GHz) Linac X-ray Source for On-site Nondestructive Evaluation", Proceeding of the Eighth IEEE International Vacuum Electronics Conference (IVEC 2007), Kitakyushu, Japan, May 13-17, pp. 443-444 (2007).

(56) References Cited

OTHER PUBLICATIONS

I.E. Mouromtseff, "Water and Forced-Air Cooling of Vacuum Tubes, Nonelectronic Problems in Electronic Tubes"; Proceedings of the IRE, vol. 30, Issue 4, pp. 190-205, Apr. 1942.

Clayton et al., "A Versatile 2 MeV, 200 mA Compact X-Band Linac", Proceedings of the 1993 IEEE Particle Accelerator Conference. May 17-20, 1993, Washington, DC, 15th IEEE Particle Accelerator Conference, p. 558-560. Available at: http//accelconf.web.cern.ch/Accelconf/p93/PDF/PAC1993_0558. PDF.

R.G. Schonberg et al., "Portable, X-Band, Linear Accelerator Systems" IEEE Transactions on Nuclear Science, 1985, http://accelconf.web.cern.ch/Accelconfp85/PDF/PAC1985_3234.PDF.

Andrey V. Mishin, "Advances in X-Band and S-Band Linear Accelerators for Security, NDT, and Other Applications", Proceedings of the 2005 Particle Accelerator Conference, pp. 240-244. Available at: http//epaper.kek.jp/p05/PAPERS/FOAB002.PDF.

Koch and Motz, "Bremsstrahlung Cross-Section Formulas and Related Data" Review of Modern Physics, vol. 31, No. 4, pp. 920-955, Oct. 1959.

J.W. Motz et al. "Eleven-Mev Thick Target Bremsstrahlung", Physical Review, vol. 89, No. 5, pp. 968-971, Mar. 1, 1953.

J. Haimson, "Some Aspects of Electron Beam Optics and X-Ray Production with the Linear Accelerator", Varian Associates, Reprinted from IRE Transactions on Nuclear Science, vol. NS-9, No. 2, Apr. 1962.

C. H. Goldie et al., "Radiographic Properties of X-rays in the Two-to Six-Million-Volt Range", ASTM Bulletin, No. 201, pp. 49-54, Oct. 1954.

W.W. Buechner et al., "An Investigation of Radiography in the Range from 0.5 to 2.5 Million Volts", ASTM International, pp. 75-95, Jul. 1950.

Yamamoto et al., "Development of Portable 950 KEV X-Band LINAC X-Ray Source for On-Site Nondestructive Evaluation", pp. 635-637, AccApp'07, Pocatello, Idaho, Jul. 29-Aug. 2, 2007. Available at: http://mathematicsandcomputation.cowhosting.net/ACCAPP-2007/data/papers/178111.pdf.

International Search Report from PCT/US2008/011717, dated Jan. 16, 2009.

Written Opinion of the International Searching Authority from PCT/US2008/011717, dated Jan. 1, 2009.

U.S. Government Contract No. H92236-06-D-1004, executed Aug. 1, 2006.

\* cited by examiner

CHARGED PARTICLE ACCELERATORS, RADIATION SOURCES, SYSTEMS, AND METHODS

RELATED APPLICATIONS

The present application is a continuation of U.S. patent application Ser. No. 13/366,963, which was filed on Feb. 6, 2012 and will issue on May 12, 2015 bearing U.S. Pat. No. 9,030,134, which is a continuation of U.S. patent application Ser. No. 12/287,792, which was filed on Oct. 14, 2008 and issued on Feb. 7, 2012 bearing U.S. Pat. No. 8,111,025, which claims the benefit of U.S. Provisional Patent Application No. 60/998,691, which was filed on Oct. 12, 2007, and U.S. Provisional Patent Application No. 61/007,500, which was filed on Dec. 13, 2007, all of which are assigned to the assignee of the present application and are incorporated by reference herein.

STATEMENT OF GOVERNMENTAL RIGHTS

The U.S. Government has certain rights to this invention pursuant to Contract No. H92236-06-D-1004 with the U.S. Department of Defense.

FIELD OF THE INVENTION

This invention relates generally to charged particle accelerators and radiation sources and, more particularly, to lightweight man-portable X-ray radiation sources, systems using such sources, and methods.

BACKGROUND OF THE INVENTION

X-ray scanning has been used to identify explosive materials, such as TNT, and wires of electronic control, timing, and/or detonation devices for explosive devices in suspect objects, for example. X-ray scanning may also be used to identify high atomic number material that may be special nuclear materials, such as uranium and plutonium, or shielding for such materials, such as tungsten and lead. X-ray scanning may also identify explosive devices that could be used to disperse radioactive, chemical, or biological materials.

Radiation having peak energies of about 0.5 MeV and higher typically comprise a particle accelerator, such as a linear radiofrequency ("RF") particle accelerator, to accelerate charged particles, and a source of charged particles, such as an electron gun, to inject charged particles into the accelerator. The linear accelerator may comprise a series of linearly arranged, electromagnetically coupled resonant cavities in which standing or traveling electromagnetic waves for accelerating the charged particles are supported. The charged particles injected into the resonant cavities are accelerated up to a desired energy and directed toward a conversion target to produce radiation. Where the accelerated charged particles are electrons and the target is a heavy material, such as tungsten, Bremsstrahlung or X-ray radiation is generated. Electrons accelerated to a nominal energy of 1 MeV and impacting tungsten, will cause generation of X-ray radiation having a peak energy of 1 MeV, for example.

A microwave (RF) power source provides RF power to the cavities of the accelerator. The microwave source may be an oscillating microwave power tube, such as a magnetron, or an amplifying microwave power tube, such as a klystron. The microwave sources are powered by modulators, which generate high electric power pulses having peak electric powers of from 1 MW to 10 MW, and average powers of from 1 kW to 40 kW, for example.

Typical MeV radiation sources weigh several tons. Once set up at a location for scanning, they are not readily moved. Portable MeV radiation sources are known, which can be moved by truck or forklift, for example. They may be more readily moved to different locations.

One example of a portable MeV radiation source is a Mini-Linatron, which was available from Varian Associates, Palo Alto, Calif. As described in literature from Varian Associates, the Mini-Linatron comprised an X-ray head, a power module, a control case, and a modulator module that were connectable by transmission lines, cables and hoses. The X-ray head, which is said to have weighed from 100 pounds (45 kg) including a 2 MV-6 MV accelerator, and 300 pounds (136 kg) including a 9 MV accelerator, also contained an ion chamber and a collimator. The power module, which is said to have weighed 300 pounds (136 kg), contained a magnetron, a pulse transformer, and other RF components. The modulator module, which weighed 300 pounds (136 kg), is also said to have contained a pulse modulator, an electronic line-type chassis, and a power supply. The control case is said to have weighed 11 pounds (5 kg). A Mini-Linatron including a 2 MV accelerator therefore weighed about 711 pounds (323 kg). "MINI Field Portable X-Ray Equipment," Varian Associates, Oct. 1997.

Another modular high energy source for mobile and fixed installations, available from Varian Medical Systems, Inc., Palo Alto, Calif. ("Varian"), is the Linatron®-M™. An X-ray head module including a 3 MV M3 Linatron® accelerator and RF unit, which includes a magnetron and pulse transformer, is said to weigh 1,950 pounds (886.3 kg). "Linatron®-M™ Modular high every radiation source," Varian Medical Systems, Inc., September 2007.

Another portable system which was available from Varian is the Linatron-MP, in which an X-ray head module including a 4 MV accelerator weighs 150 pounds (68 kg), a modulator cabinet weighs 685 pounds (311 kg), and an RF unit weighs 340 pounds (155 kg). "VARIAN'S LINATRON-MP: THE PORTABLE SYSTEM" for Field Radiography," Varian Medical Systems Technology, Inc., 2003.

Russell G. Schonberg describes a 4 MeV traveling wave accelerator packaged with a 9.3 GHz magnetron r.f. source and a pulse transformer, weighing about 190 pounds (86 kg), in "A History of the Portable Linear Accelerator." Schonberg states that "the total weight was marginal for two people at 190 pounds . . . ." Schonberg does not identify the weight of the modulator and power supplies, which, as described above, typically weigh many hundreds of pounds. "The History of the Portable Linear Accelerator", Russell G. Schonberg, The American Association of Physicists in Medicine, Annual Meeting, 2001.

SUMMARY OF THE INVENTION

As used herein, the term "man-portable radiation source" means a radiation source with components that are arranged in subunits that may be carried by one or two people to a site of interest and set up, as compared to a "portable" radiation source, which has been used to refer to a source that is non-permanent and relocatable or movable by a forklift, a dolly, rolling on integral wheels, or lifting by multiple persons. Similarly, a "man-portable radiation scanning system" means a radiation scanning system with components that are arranged in sub-units that may be carried by one or two people to a site of interest and set up.

In accordance with an embodiment of the invention, a man-portable radiation generation system is disclosed comprising a first module containing at least one battery and a second module containing a modulator. The first and second modules are configured to be selectively electrically coupled to each other. The system further comprises a third module containing a charged particle accelerator. The second and third modules are configured to be selectively electrically coupled to each other and the at least one battery provides power to the first and second module when the first, second, and third modules are electrically coupled. Each module is portable by hand by one or two people. Each module may be portable by hand by one person. The system may weigh less than 300 pounds (136 kg), or less than 225 pounds (102 kg), for example. The first, second, and third modules may each weigh less than 100 pounds (34 kg) or less than 75 pounds (34 kg), and at least one of the first, second, and third modules may weigh less than 50 pounds (23 kg). At least one of the modules comprises a case with handles.

The first module may further comprises a controller to control operation of the source and a control device removably mounted to the first module, for remote control of the controller. The first module may further comprise a cable electrically coupling the control device to the controller, and a spool, around which the cable is selectively wound. An electrical plug may be provided for connection to an external power source.

The third module may further comprise an electron gun mounted to the accelerator, to inject electrons into the accelerator, a target coupled to the accelerator to generate X-ray radiation upon impact by accelerated electrons, a magnetron coupled to the accelerator to provide radiofrequency power to the accelerator, and the modulator, which in this example is powered by the at least one battery, provides power to the electron gun and to the magnetron. The third module may weigh less than 80 pounds (36 kg).

The third module may also comprise a rigid support coupled to at least one inner wall of the third module, and the accelerator may be coupled to the support. The support is coupled to the at least one inner wall by at least one resilient member. The accelerator and the magnetron may be suspended from the support, at a position such that respective spaces are provided between the accelerator and the magnetron, and an opposing wall of the case. The support may comprise a rigid plate connected to the at least one inner wall and at least one elastomeric member coupling the accelerator to the rigid plate. A second rigid plate may be coupled to the first rigid plate by the at least one elastomeric member and the accelerator may be connected to the second rigid plate.

The portable radiation generation system may be configured to generate radiation having a peak energy of about 1.0 MeV, for example. The system may be configured to generate radiation greater than 500 kHz and less than about 1 MeV, for example.

A plurality of fins may be coupled to an exterior surface of the accelerator. At least some of the plurality of fins are transverse to a long axis of the accelerator. A cover covering at least some of the plurality of fins may be provided, to form a cooling manifold having a first opening for air to enter the cooling manifold and a second opening for air to exit the cooling manifold. The third module has at least one wall defining at least one air inlet opening. At least one fan is proximate the at least one air inlet vent to move air through the third module and a guide is provided to direct air into the first opening. A duct may be provided to convey air from the at least one air inlet vent to the guide. A duct may convey air from the fan to the first opening.

In accordance with another embodiment, a man-portable radiation scanning system is disclosed comprising the man-portable radiation source described above and a detector. The system may further comprise a display to be coupled to the detector array. The detector may comprise radiographic film, for example.

In accordance with another embodiment of the invention, a man-portable radiation generation source is disclosed comprising a first module comprising a case containing at least one battery and a second module comprising a second case containing a source of charged particles, a charged particle accelerator, a target, a modulator, and a magnetron, wherein the first and second modules are configured to be selectively electrically coupled to each other. Each module is portable by hand by one or two people.

In accordance with another embodiment, a charged particle accelerator is disclosed comprising a source of charged particles and an accelerator comprising a buncher cell defining a buncher cell cavity. The charged particle source is coupled to the buncher cell to inject electrons into the buncher cell cavity, which captures and r.f. focuses the injected electrons into an electron beam. A plurality of linearly arranged cells defining periodic, linearly arranged accelerating cavities are downstream of the buncher cell, to receive and accelerate the electron beam. An output cell is downstream of the accelerating cells, to receive and output the accelerated electron beam. The cells further define a plurality of linearly arranged on-axis coupling cavities between respective cells. The buncher cell and a first periodic cell following the buncher cell are configured such that a field step ratio between the peak amplitude of the electric field in the first cell cavity and the peak amplitude of the electric field in the buncher cell cavity is greater than one (1), during operation. A cell period ratio between a cell length from a center of one periodic cell cavity to a center of next accelerator cell cavity, and half the free space wavelength of the accelerator during operation, is less than one (1). The field step ratio may be less than (2), during operation. The field step ratio may be from 1.2 to 1.5, or from 1.3 to 1.4. The cell period ratio may be greater than 0.78 and less than 0.82. The field step ratio may be 1.3, the cell length may be 12.5 mm, and the cell period ratio may be 0.78. A buncher cell ratio between a length of the buncher cell and half the free space wavelength of the accelerator may be less than one-half. The buncher cell ratio may be 0.3. The accelerator may comprise periodic coupling cavities between the periodic accelerating cavities.

The accelerator may be configured to define a particle beam having a spot size encompassing 75% of the beam on the target having a diameter of less than 2 mm, during operation. The accelerator may weigh seven pounds (3.2 kg) or less. As described above, a plurality of fins may be coupled to an exterior wall of the accelerator, and a cover may be provided to cover at least some of the plurality of fins to define a cooling manifold with openings for air to enter and exit the cooling manifold. A tube adjacent to an outer wall of the accelerator may be provided to provide cooling or heating fluid adjacent to the outer wall.

A magnetron may be coupled to the accelerator. The magnetron may drive the accelerator with radiofrequency energy having a frequency selected to excite the resonate cells with standing waves with $\pi/2$ radian phase between a coupling cell and a next accelerating cell. The magnetron may drive the accelerator at a frequency of 9.3 GHz, during operation, for example. The charged particle source may comprise an electron gun configured to operate at the same voltage as the magnetron, or lower voltage. The electron gun may comprise an anode plate coupled to the buncher cell. The buncher cell may define a half-cell and the buncher cell cavity may be defined by the half-cell and the anode plate. The anode plate may define an aperture with an entrance to the buncher cavity dimensioned to remove charged particles at a periphery of the charged particle beam. The diameter of the entrance may be dimensioned to remove at least half of the charged particles in the beam.

The accelerator may comprise ten periodic accelerator cavities between the buncher cavity and the output cavity, for example. A target may be coupled to the output cell, wherein impact of charged particles on the target generates radiation.

In accordance with another embodiment, a radiation generation source is disclosed comprising a linear charged particle accelerator, a source of charged particles coupled to the accelerator to inject charged particles into the accelerator, and a target coupled to an output of the accelerator. Impact of the accelerated charged particles on the target causes generation of radiation. A plurality of fins are coupled to an exterior surface of the accelerator, to air cool the accelerator, as described above. At least some of the plurality of fins may be transverse to a long axis of the accelerator and a cover covering at least some of the plurality of fins to define a cooling manifold having openings for air to enter and exit the cooling manifold may also be provided. The accelerator may be contained within a case with at least one wall defining an air inlet. A fan may be proximate the inlet to cause air to move through the case and a guide may direct air into the first opening, during operation. The guide may be coupled to the manifold, and a duct may convey air from the fan to the guide. A duct may convey air from the fan to the first opening, instead. The at least one wall of the case may further define at least one exhaust vent.

In accordance with another embodiment, a method of setting up a man-portable radiation source to examine an item of interest is disclosed, wherein the radiation source comprises at least a first module containing at least one battery to power the source and a second, separate module comprising an accelerator, an electron gun, and a target. The method comprises carrying by hand the at least first and second modules to a location proximate the item of interest, by at least one person, electrically coupling at least the first module to the second module by at least one electrical cable, and moving a safe distance from the radiation source, leaving the at least first and second modules at the site. The method may further comprise removing a control device from one of the modules and moving to the safe distance, with the control device, leaving the at least first and second modules at the site. The control device may be electrically coupled to a cable rolled around a spool in the one module and the method may further comprise unrolling a spool of cable in the one module and moving to the safe distance with the control device. The method may comprise moving to a safe distance, behind a dense structure. The method may further comprise activating the source to generate radiation and scanning the item of interest with the generated radiation. A detector may be carried by hand to the location and radiation interacting with the item of interest may be detected by the detector. A third module containing a modulator may be carried to the location and electrically coupled to the first and second modules.

In accordance with another embodiment, a battery operated radiation generation source is disclosed comprising at least one battery, a charged particle accelerator, a source of charged particles coupled to the accelerator to inject charged particles into the accelerator, and a target coupled to an output of the accelerator. Impact of the accelerated charged particles on the target causes generation of radiation. A radiofrequency power supply provides radiofrequency power to the accelerator. The at least one battery provides power to the source of charged particles and the radiofrequency power supply. A modulator may be coupled to the at least one battery, to convert direct current voltage from the battery to pulses of high voltage to be provided to the source of charged particles and to the radio frequency power supply.

In accordance with another embodiment, a radiation generation source is disclosed comprising an electron source and an accelerator comprising a buncher cell defining a buncher cell cavity. The electron source is coupled to the buncher cell to inject electrons into the buncher cell cavity and the buncher cell cavity captures and r.f. focuses the electrons injected by the electron source, into an electron beam. A plurality of linearly arranged cells define periodic, linearly arranged accelerating cavities downstream of the buncher cells to receive and accelerate the electrons. An output cell is downstream of the accelerating cells and a target is coupled to the output cell to receive and output the accelerated electron beam. A target is coupled to the output cell. Impact of accelerated electrons on the target causes generation of X-ray radiation. The buncher cell, the accelerating cells, and the output cell further define a plurality of linearly arranged on-axis coupling cavities between respective cells. The buncher cell and a first periodic cell following the buncher cell are configured such that a field step ratio between the peak amplitude of the electric field in the first cell cavity and the peak amplitude of the electric field in the buncher cell cavity is greater than one (1), during operation. A cell period ratio between a distance between from a center of one periodic cell to a center of next accelerator cell, and half the free space and length of the accelerator during operation, is less than one (1). The field step ratio may be less than two (2), during operation. A buncher cell ratio between a length of the buncher cell and half the free space wavelength of the accelerator may be less than one-half. The buncher cell ratio may be 0.3. The output cell may define an inwardly tapered passage from a cavity to a target. The target may comprise a copper substrate and a tungsten layer coupled to the copper substrate. The thickness of the tungsten layer may be less than 0.25 mm, less than 0.20 mm, less than 0.10 mm, or less than 0.05 mm. Other features described above may be incorporated in the accelerator in accordance with this embodiment of the invention, as described in more detail in the specification.

In accordance with another embodiment, a radiation generation source is disclosed comprising a charged particle accelerator, a source of charged particles coupled to the accelerator to inject charged particles into the accelerator, and a target coupled to an output of the accelerator. Impact of the accelerated charged particles on the target causes generation of radiation. The thickness of the tungsten layer is less than 0.20 mm. The thickness of the tungsten layer may be less than 0.10 mm. The thickness may be 0.05 mm.

DETAILED DESCRIPTION OF A PREFERRED EMBODIMENT

There may be times when it would be advantageous to quickly and easily set up an X-ray scanning system at a particular site by one or two people. For example, the ability to quickly and easily deploy a lightweight radiation source for object examination by one or two people could facilitate the identification of explosive devices hidden in suspect objects at crime scenes, actual or potential sites of terrorist attacks, or in combat or war-time situations. Hidden improvised explosive devices ("IEDs") may thereby be identified, for example. Such a lightweight radiation source could also facilitate the identification of flaws and faults in infrastructure, such as bridges, as well as the examination of small or difficult to access locations, such as in an airplane or submarine, for example. A radiation source and radiation scanning system including such a source, which may be carried to a site by one or two people, would therefore be advantageous.

Figure 1:
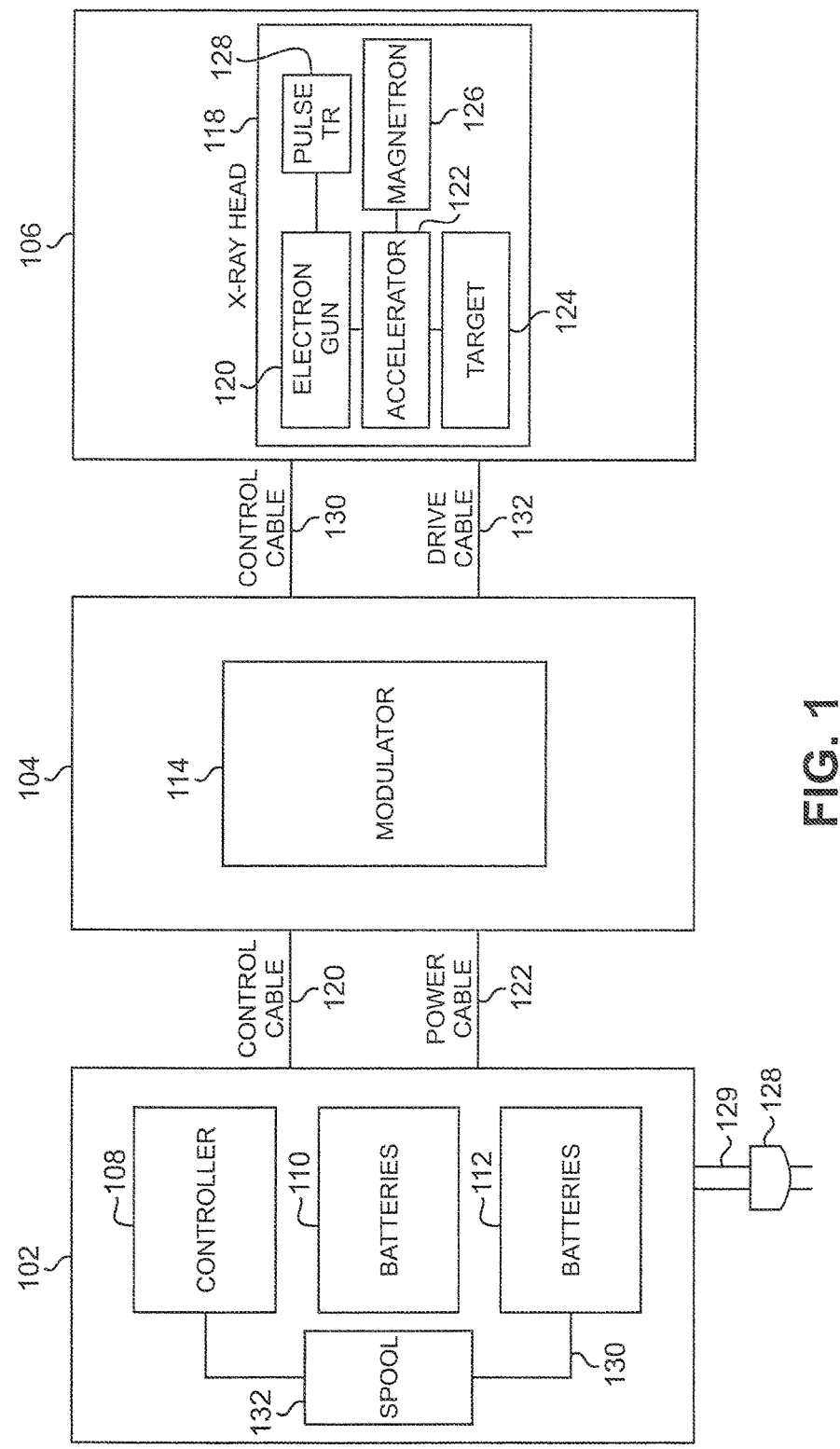
FIG. 1 is a schematic block diagram of an example of a man-portable radiation source in accordance with one embodiment of the invention.

FIG. 1 is a schematic block diagram of an example of a man-portable radiation source 100 in accordance with one embodiment of the invention. As used herein, the term "man-portable radiation source" means a radiation source with components that are arranged in subunits that may be carried by one or two people to a site of interest and set up, as compared to a "portable" radiation source, which has been used to refer to a source that is non-permanent and relocatable or movable by a forklift, a dolly, rolling on integral wheels, or lifting by multiple persons. A man-portable radiation source may be used in a "man-portable radiation scanning system," which, as used herein, means a radiation scanning system with components that are arranged in sub-units that may be carried by one or two people to a site of interest and set up.

In this example, the man-portable source 100 is designed to generate an X-ray radiation beam having peak energy of about 1 MeV (1 MeV+/−10%). In a particular example described herein, the peak energy is 0.93-0.94 MeV and the generated X-ray radiation has a half value layer ("HVL") of 0.57 inches (14.5 mm)-0.62 inches (15.7 mm). The HVL is the length of steel required to reduce X-ray dose or intensity by half. The man-portable radiation scanning system 100 in one example may image an 18 gauge (7 mm) diameter copper wire through 3 inches (7.6 cm) of steel. As discussed above, electronic control, timing, and/or detonation electronics for explosive devices may include wires. These are just exemplary energies and higher energy (greater than about 1 MeV) man-portable radiation sources may be made in accordance with embodiments of the invention at other energies and HVLs. For example, man-portable radiation sources of 3 MeV or 6 MeV may also be provided. In addition, lower energy radiation sources, such as 500 KeV sources and higher may also be made in accordance with embodiments of the invention.

In this example, the X-ray source 100 comprises separate first, second, and third modules 102, 104, 106, respectively, each light enough to be carried by one or two persons. In this example, each module 102, 104, 106 weighs less than 100 lbs (45 kg). Certain modules may weigh less than 75 lbs (34 kg) or less than 50 lbs (23 kg), for example. Each module 102, 104, 106 and thereby the source 100 are therefore man-portable, meaning that each module may be moved by one or two people without the assistance of a machine, such as a forklift.

The first module 102 in this example comprises a controller 108, one or more batteries 110, and a remote control (or pendant) 112. The second module 104 in this example comprises a modulator 114. The third module 106 in this example comprises an X-ray head 118. The X-ray head 118 in this example comprises an electron gun 120, an accelerator 122, a target 124, a magnetron 126, and a pulse transformer 128. The first module 102 may be coupled to the second module 104 by a first, control cable 120 and a second, power cable 122. The second module 112 may be coupled to the third module 106 by a control cable 124 and a drive cable 130. The drive cable may comprise two separate cables, one for the filaments of the electron gun 120 and magnetron 126, and another for pulses provided to the electron gun and magnetron. The controller 108 controls operation of the source 100, under the control of the pendant 112, which is a portable remote control that may be physically mounted in the first module 102 when not in use. The batteries 110 provide DC power to the modulator 114, which converts the DC power to pulses to drive the magnetron 126 and electron gun 120. The pulse transformer 128 permits use of a lower voltage on the cable connectors. The magnetron 126 generates an electromagnetic field that is provided to resonant cavities within the accelerator 122. Electromagnetic standing waves are supported within the accelerator 122. Electrons provided by the electron gun 120 to the accelerator 122 are accelerated by the standing electromagnetic waves. The accelerated electrons impact the target 124 causing generation of X-ray radiation by the Bremsstrahlung effect. Alternatively, a traveling wave accelerator may be used.

Figure 2:
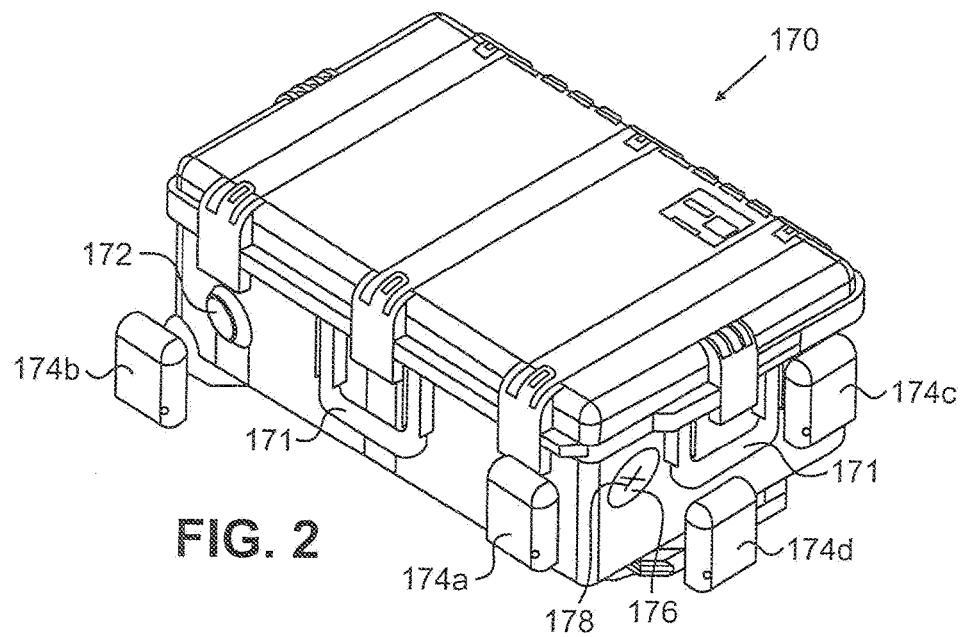
FIG. 2 is a perspective view of an example of a case for any or all of the modules.
Figure 2A:
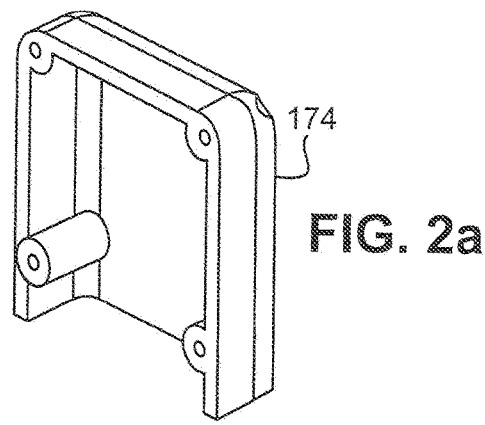
FIG. 2a shows a view of the inner surface of a deflector that may be used in the case of FIG. 2.
Figure 2B:
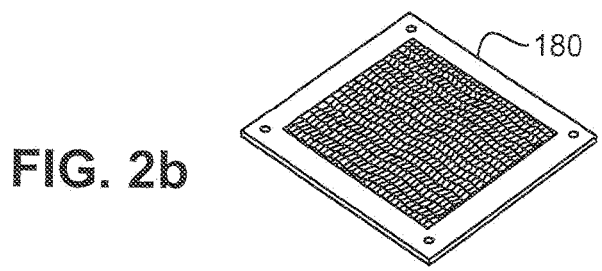
FIG. 2b shows an EMI shielded filter screen that may be provided in the inlet vents and the exhaust vents in the case of FIG. 2.

FIG. 2 is a perspective view of an example of a case 170 for any or all of the modules 102, 104, 106 when resting on a surface. Two handles 171 are shown along different sides of the case 170. Additional handles on a side or a longer handle may be provided to facilitate carrying by two people, if desired. Two exhaust air vents 172 are provided, one shown covered by a precipitation deflector 174a in FIG. 2 and the other shown with the deflector 172b separated from the case 170 for illustrative purposes. FIG. 2a shows a view of the inner surface of the deflector 174. Returning to FIG. 2, two inlet air vents 176 are also provided, one covered by a deflector 174c and the other shown with the deflector 174d separated from the case 170 for illustrative purposes. Intake fans 178 are provided in the inlet air vents 176 to increase air flow through the vents and the case 170, as described below. In this example, each case 170 for each of the modules 102, 104, 106 is identical, to decrease cost and for simplicity, but that is not required. An EMI shielded filter screen 180, shown in FIG. 2b, may be provided in the inlet vents 176 and the exhaust vents 172, as well.

The case 170 may be a commercially available case or a custom designed case. The case 170 shown in FIG. 2 is a commercially available Storm Case IM 2950, available from Hardigg Industries, South Deerfield, Mass., which weighs 20.8 lbs. (9.4 kg) (without foam). The internal dimensions of the IM 2950 are 29 inches (74 cm)×18 inches (46 cm)×10.5 inches (27 cm). The Storm Case IM 2590 does not include openings for vents. The inlet vents 176a, 176b and the exhaust vents 172 are therefore added. The Storm Case IM 2950 includes wheels, which may be removed to further decrease the weight of the modules, if desired.

Another commercially available case 170 is the Pelican 1650®, available from Pelican™ Products Inc., Torrance, Calif., which weighs about 29.1 lbs (13 kg), (without foam). The Pelican 1650® has internal dimensions of 28.5 inches (73 cm)×17.37 inches (44 cm)×105 inches (266 cm). The Pelican 1650® also does not include openings for vents and the inlet vents 176a, 176b and the exhaust vents 172 would need to be added. As above, wheels may be removed, if desired.

Another commercially available case 170, which is lighter than the Pelican 1650®, is the Seahorse SE 1220, available from Seahorse, Covina, Calif., which weighs about 24.44 lbs (11 kg). The internal dimensions of the SE 1229 are 25.52 inches (65 cm)×19.5 inches (50 cm)×13.08 inches (33 cm). The Seahorse SE 1220 also does not include openings for vents and the inlet vents 176a, 176b, and the exhaust vents 172 would need to be added. As above, wheels may be removed, if desired.

Figure 3:
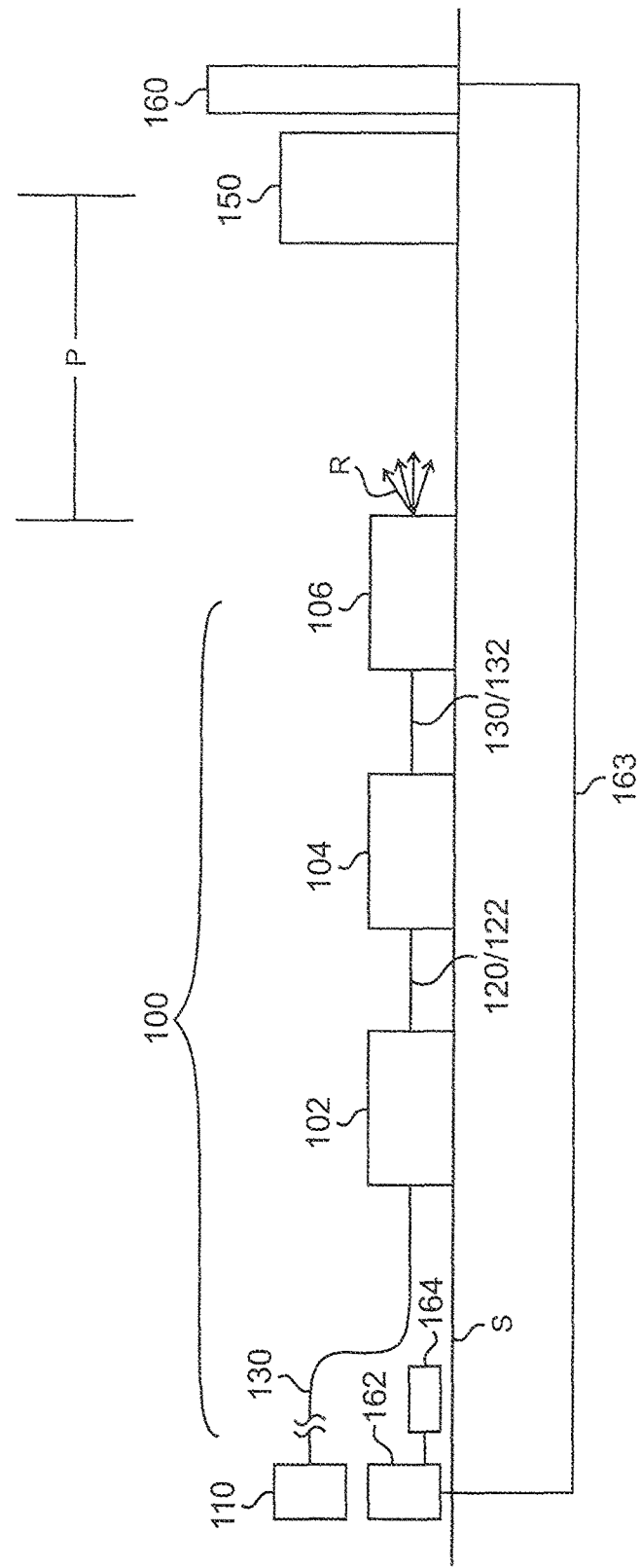
FIG. 3 is an example of a man-portable radiation system incorporating the man-portable radiation source of FIG. 1, at a site of interest.

To inspect an item of interest 150 with the man-portable X-ray source 100 in accordance with one embodiment of the invention, the modules 102, 104, 106 may be driven to a site near the item of interest by a vehicle, such as a car, jeep or truck, for example, and unloaded. The modules 102, 104, 106 may then be carried to and positioned proximate the item 150 by one or two people, as shown in FIG. 3. One person may carry one or two of the modules 102, 104, 106 by the handles 140, at a time. If two handles 140 on a side or a long handle are provided, as discussed above, two people can carry one module at a time.

To assemble the source 100 proximate the item of interest 150, the third module 106 is positioned a distance P from the item, as shown in FIG. 3, for example. The distance P may be any suitable distance. For example, the distance P may be about 1 meter. The first and second modules 102, 104 are positioned near the third module 106 and are coupled to each other via a control/power cable 120/122, which may be a combined cable or separate cables. The second module 104 is coupled to the third module 106 by a combined or single control/drive cable 130/132. The position of the first and second modules with respect to the third module may depend on the length of the cables 120/122, 130/132. In this example, the cables 120/122, 130/132 are about 1 meter long, to reduce capacitive effects and still allow for flexibility in placement of the modules 102, 104, 106 at the scanning site. In one example, the man-portable X-ray source 100 may be assembled in about two minutes, for example.

One or more detectors 160 may be positioned a suitable distance behind the item of interest 150 to detect radiation transmitted through the item, as shown in FIG. 3, and/or one or more detectors 160 may be positioned to detect scattered radiation. The detector 160 may be an imaging panel, such as the HE4030 imager system, available from Varian Medical Systems, Inc., Palo Alto, Calif., for example, which weighs about 30 lbs (14 kg), or X-ray film. Film packets may weigh from about 10 lbs (4.5 kg) to about 12 lbs (5.4 kg), for example. Other types of detectors may be used, instead.

A processor 162 may be coupled to the detector 160 by a cable 163, and a display 164 may be coupled to the processor. The processor 162 and the display 164 may comprise a laptop computer weighing about 5 lbs (2-3 kg) to about 20 lbs (9 kg), depending on the model, for example. The detector 160, the processor 162, and the display 164 may be carried to the site by one or two people in one or two trips. In this example, the cable is long enough for the processor 160 and the display 164 to be used by an operator about 30 m from the X-ray source, as discussed below, such as from about 30 m to about 40 m, for example The detector 160 may be coupled to the processor 162 wirelessly, if interference is not a concern.

The detector 160 may also comprise X-ray film, in which case a processor and display are not needed. Since film developers are quite large and heavy, a film developer is not incorporated in the system. The film may be carried from the site to a developer in another location. Imaging of an 18-gauge wire through 3 inches (76 mm) of steel could take from about 3 minutes of X-ray beam-time for some film types up to about one hour for others. Use of film requires shielding of unexposed film from the radiation field emitted by the X-ray head 118, as is known in the art, to protect against premature exposure by radiation from the unshielded, non-collimated X-ray head 118. Commercially available film, such as GAFCHROMIC® EBT film, available from International Specialty Products, Wayne, N.J., may be used, for example.

Other components as needed may also be carried to the site and coupled to the modules 102, 104, and/or 106. For example, the accelerator 122, the modulator 114, and/or the magnetron 126 may require water cooling and/or heating, as discussed below. A water supply and pump (not shown) may be carried to the site and coupled to the modulator 114, the accelerator 122, and/or to the magnetron 126. The water supply and pump may be included within one of the modules, such as the first module 102, or in a separate module, for example.

In the example described herein, no collimator is used and radiation R is emitted in all directions. Alternatively, the third, X-ray head module 106, may include a recess (not shown) to receive a field deployable collimator, which could weigh about 30 lbs (14 kg). The collimator may be carried to the site of interest separately from the modules 102, 104, 106, for example.

A major source of the weight in a radiation source is radiation shielding. To reduce the weight of the third module 106, no shielding is provided around the X-ray head 118. However, radiation is emitted in all directions, which could increase the risk of deleterious exposure to operators and others in the area. In the example described herein, radiation leakage may be as high as 1 R/m at 1 meter, or 60,000 mR/hour.

To protect the operator and other personnel from dangerous radiation exposure, after assembly of the X-ray source 100 at a site, distance is used to reduce exposure along with field expedient measures, if available, such as taking cover behind a masonry wall, an earthen berm, or other dense object. Personnel should move as far as possible from the third module 106. They should be at least about 30 meters from the third module 106, in this example. At 30 meters in the open, the X-ray dose could be as high as 70 mR/hour at 1 meter, corresponding to a "radiation area."

An operator may remove the pendant 112 from the first module and carry the pendant to the safe location and/or behind a dense structure, such as a concrete wall or building, if in the vicinity. Such a dense structure may provide sufficient protection at less than 30 meters from the third module 106. If the pendant 112 is connected to the controller 104 by the cable 130, the cable may be wound on a spool 132 when stored in the first module 102 and unwound as the operator moves to the safe location. The cable may be 40 meters long, for example. If wirelessly controlled, the operator may similarly move to the safe location before activating the system 100.

Personnel assembling and operating the source 100 may also carry personal dosimeters to monitor their exposure. An alarm bell may be provided to alert the personnel to a pre-set exposure. Perimeter access should be controlled to avoid exposure to others. Separate shielding slugs of shielding material (not shown) may be positioned around the third module 106 at a desired site, if desired, to enable personnel to be closer to the item of interest 150 during operation.

Where a digital imager is employed, the image may be analyzed immediately on a laptop, from the operator position. As discussed above, the digital imager may be an HE4030 imager from Varian Medical Systems, Inc., for example. It takes about 3-seconds for the HE4030 imager to generate an image. Since beam on time is reduced when using a digital imager, radiation exposure of personnel may be reduced by a factor of about 50 as compared to the use of film. Digital imaging also reduces battery usage, increasing battery life compared to use of film. The HE4030 digital imager, which weighs about 15 lbs, may be stored in the first module 102. A laptop computer may be used to process and display the images, as is known in the art.

After imaging of the item of interest 150, the modules 102, 104, 106 and the X-ray source 100 may be quickly disconnected and removed from the site, by one or two people carrying each module 102, 104, 106.

The First Module

As discussed above, the first module 102 contains the controller 108, the batteries 110, and the pendant 112, and related components. The controller 108, which controls operation of the source 100, may be a processor, such as a programmable logic controller ("PLC"), which may be a commercial off the shelf processor board. A battery operated, "wireless" radiation source, which is not limited to use near conventional power supplies, is more versatile than a source that must be plugged in to a conventional source. As discussed below, however, the man-portable radiation source 100 may be driven by conventional AC power in addition to or instead of batteries 110.

As discussed above, the pendant 112 is a portable remote control that may be physically mounted in the first module 102 when not in use. In one example, a display screen is provided to display status information, such as warming up, beam on, exposure time and/or dose, and remaining battery life, for example. The pendant 112 may be coupled to the controller 104 by a cable 130 or where the application does not have sensitive electronics, wirelessly. If wirelessly controlled, electromagnetic/radio-frequency interference may need to be controlled. The cable 130 may be wound on a spool 132. As discussed above, a 40 meter cable may be used, for example. The pendant 112, controller 104, and cables 120, 122, 130, 132 may weigh up to about 10 lbs (4.5 kg), for example.

Functions on the pendant 112 may include a red emergency off button to de-energize the system 10, a yellow warning light for a fault causing the X-ray beam to turn off, and a manual override button to provide an instant "beam-on" and "beam-off", for example. Alternatively, the pendant 112 may be mounted in any of the other modules 104, 106 where there is room. If the pendant 112 and the controller 108 are in different modules, additional cables may be required. The third module 106 may include an emergency off button instead or in addition to the emergency off button on the pendant 112.

The batteries need to supply sufficient power to image for a desired period of time. In one example, the batteries provide sufficient power to scan for about 100 minutes continuously, at about 1 Rad/minute. In order to supply such power for such a period of time, the typical power requirements and operating levels of other components of the source, such as the modulator 114, the electron gun 120, and the magnetron 128, need to be conserved. That requires changes in the typical design of the accelerator 122, examples of which are described below.

The batteries 110 in the first module 102 generate DC voltage, such as 240 volts, which is provided to the modulator 116 in the second module 112 via the power cable 122. In one example, the batteries need to store 640 kilojoules. The batteries 106 may comprise a pack of ten (10) 24 volt commercial batteries, for example. The battery pack may weigh about 20-25 pounds (9 kg-11 kg), for example. A separate compartment in the first module 102 may be provided for the cables 120, 122, 130, 132 and the pendant 110. The batteries may be rechargeable and/or replaceable in the field.

The batteries may be a BA 5590 lithium/sulphur dioxide battery pack system from Saft Groupe SA, Bagnolet, France ("Saft"), which is said to comprise 10 LO26 SX cells connected in two groups of 5 cells in series, providing 2 nominal 12 volt sections at the connector, for example. The sections may be connected in series to provide 24 volts or in parallel to provide 12 volts. According to a specification provided by Saft, the typical operating control voltage ("OCV") is 15.0 or 30.0 volts, the nominal voltage (at 500 mA) is 13.5 or 27.0 volts, and the cutoff voltage is 10.0 or 12.0 volts, depending on whether the sections are connected in series or in parallel. The typical capacity (at 70° F. (21° C.)), 250 mA discharge current is said to be 15 hours in a 12 volt mode and 24 hours in a 24 volt mode. The batteries are said to operate over a temperature range of from −40° F.

(−40° C.) to 160° F. (71° C.). Each battery is said to weigh 2.25 pounds (1 kg), and the battery pack weighs about 22.5 pounds (10 kg).

Alternatively, lithium ion polymer batteries, such as LIP-5 ("LIP") available from LINCAD, Ltd., Camberley, Surrey, England may also be used, for example. Lithium ion rechargeable batteries, such as the UBI-2590, available from Ultralife Batteries, Inc., Newark, N.J., for example, may also be used. Nickel metal hydride rechargeable batteries, such as those used in battery operated cars, may also be used.

An electrical plug 128 and cable 129 may be provided in the first module 102 for connection to a conventional source of AC power, such as a wall outlet providing 110 volts or a generator, for example. If the batteries 106 are rechargeable, the AC power may be used to recharge the batteries. The modulator 114 may also be powered by an AC power source (not shown) during use, if the cable 129 is long enough to reach it.

A fan (not shown) may be provided for further air circulation and cooling.

The weight of the first module 102 in this example is from about 50 lbs (23 kg) to about 80 lbs (36 kg), depending on the weight of the case 170. If the Storm Case IM 2950 is used, for example, the first module 102 would weigh about 50 lbs (23 kg) to about 70 lbs (32 kg), for example, which may be readily carried by one person.

The Second Module

The second module 104 contains the modulator 114, which converts the DC power provided by the batteries 106 to suitable pulses to drive the magnetron 126 in the X-ray head 118 in the third module 106, as is known in the art. In one example, the modulator 116 converts the 24 volts provided by the batteries 106 to 2.2-2.4 microsecond pulses at about 29 kilovolts and 30 Amps. Alternatively, the modulator 104 may be included in the same module 106 as the X-ray head 118. While increasing the weight of the third module 106, fewer cables would be required, decreasing the risk of arcing.

To reduce the weight of the source 100, the X-ray head 118 in this example is designed to operate under less power than typical X-ray heads (as discussed below), allowing for a smaller modulator 114. With the X-ray head 118 described in this example, a 29 kV, 30 A modulator may be used. In this example, the modulator 114 is a commercially available modulator weighing about 75 lbs (34 kg) or less.

For example, the Stangenes Model SSM-3-3-M1, available from Stangenes Industries, Inc., Palo Alto, Calif., may be used. The SSM-3-3-M1, which weighs about 75 lbs (34 kg), is capable of 36 kV, 80 A at 0.001 duty with a 2-millisecond pulse.

Alternatively, the Scandinova Model Type M1, which also weighs about 75 lbs (34 kg), provides 48 kV and 110 A at 0.0012 duty, available from Scandinova AB, Uppsala, Sweden, may be used.

As in the first module 102, the case 170 housing the second module 104 includes vents and one or more fans (not shown).

The weight of the second module 106 is about 75 lbs (34 kg) plus the weight of the case 170. If the Storm Case IM 2950 is used, the second module would weigh about 96 lbs (44 kg), for example, which may be carried by one or two people.

The Third Module

As discussed above and shown in FIG. 1, the third module 106 contains the X-ray head 118. The X-ray head 118 comprises an electron gun 120, an accelerator 122, a target 124, a magnetron 126, and a pulse transformer 128.

Figure 4:
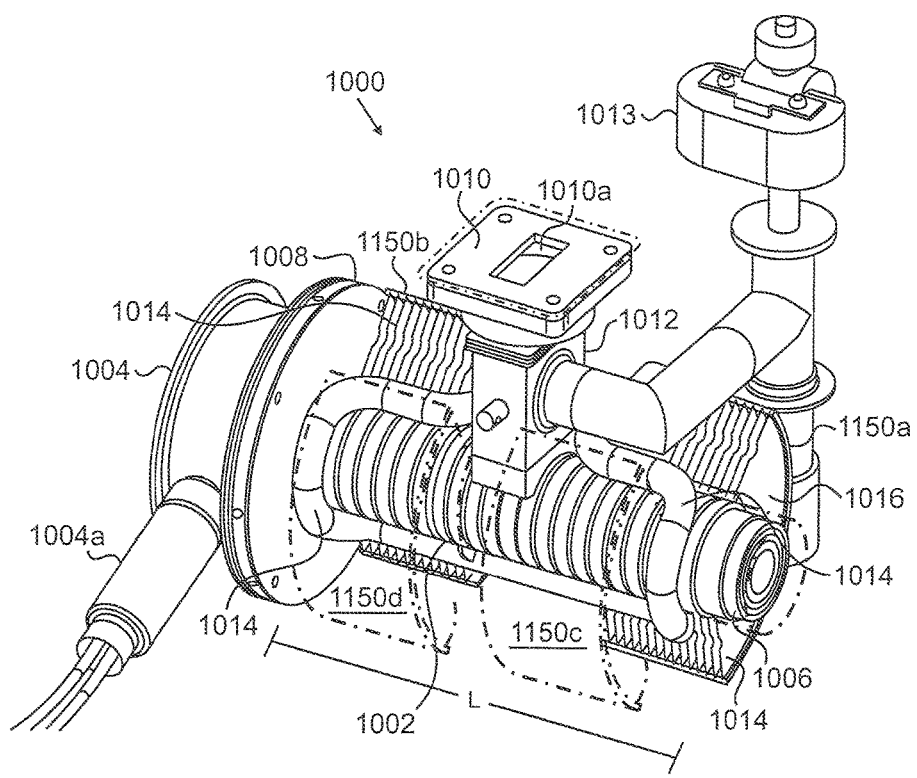
FIG. 4 is a perspective view of an example of an accelerator in accordance with an embodiment of the invention.

FIG. 4 is a perspective view of an example of an accelerator 1000 in accordance with an embodiment of the invention. The accelerator 1000 comprises a biperiodic, standing wave electron beam linear accelerator body 1002. The accelerator 1000 operates in the X-band at 9.3 GHz. X-band accelerators may be smaller than S-band accelerators, which operate at 3 GHz, as is known in the art. An S-band accelerator may be used in accordance with embodiments of the invention, if a larger and heavier X-ray radiation source 100 may be tolerated. An electron gun 1004 is coupled to one end of the accelerator body 1002 and a target assembly 1006 is coupled to the opposite end. The electron gun 1004 is coupled to the accelerator body 1002 via an anode plate 1008. A waveguide window 1010 and a waveguide 1012 couple the accelerator body 1002 to the magnetron 126 (shown in FIG. 9*a*). In this example, the waveguide window 1010 defines a rectangular opening 1010*a*. A vacuum pump 1013 is coupled to the waveguide 1012 to create a vacuum within the waveguide and the accelerator body 1002. An optional cooling tube 1014 for water cooling or heating of the accelerator body 1002, is also shown. Cooling fins 1016, may also be provided instead of or along with the cooling tube 1014, as discussed in more detail below.

The accelerator body 1002 shown in the example of FIG. 4 weighs from about 6 pounds (2.7 kg) to about 7 pounds (3.2 kg). The accelerator 1000 has a length "L" of about 6 inches (about 15 cm) not including the electron gun 1004 but including the target assembly 1006. The accelerator body 1002 has an outer diameter of about 35 mm without the cooling fins 1016 and about 96 mm with the fins. The dimensions of the cooling fins 1016 are based on providing stable operation over an ambient temperature range of from about 0° C. to about 56° C. The fins 1016 have been found to provide stable operation up to about 70° C. ambient. Smaller fins 1016 may be used if operating conditions are more tightly controlled. The accelerator 1000 would then have a smaller diameter.

Electron guns for many X-ray radiation sources are typically driven at a high voltage of about 20 kV to about 100 kV with a separate power supply or transformer. Higher voltage requires larger clearances (10 kV/inch, 254 kV/mm), and also adds to power supply weight. To reduce the weight of the X-ray head 118, the accelerator 1000 is designed to allow operation of the electron gun 1004 at about the same voltage as the magnetron 126, or less voltage. The accelerator 1000, in this example, also accommodates a low accelerating gradient, which may be 6 MV/M, for example, required by the relatively low peak power available from the modulator 114 and the magnetron 126. The electron gun 1004 is driven at a lower than typical voltage of 26 kV-29 kV.

The electron gun 1004 may be a commercially available diode gun with a perveance of 0.1 uperv. The electron gun voltage is at or below the magnetron voltage, which in this example is 28 kV. Voltage is provided to the electron gun 1004 via a high voltage connector 1004*a*.

The vacuum pump 1013 may be a 0.2 liter/second ion pump, referred to as a Vacion pump, such as a mini ion pump with smaller magnets, Part Number 8130038, available from Varian Vacuum Technologies, Torino, Italy, for example.

Figure 5:
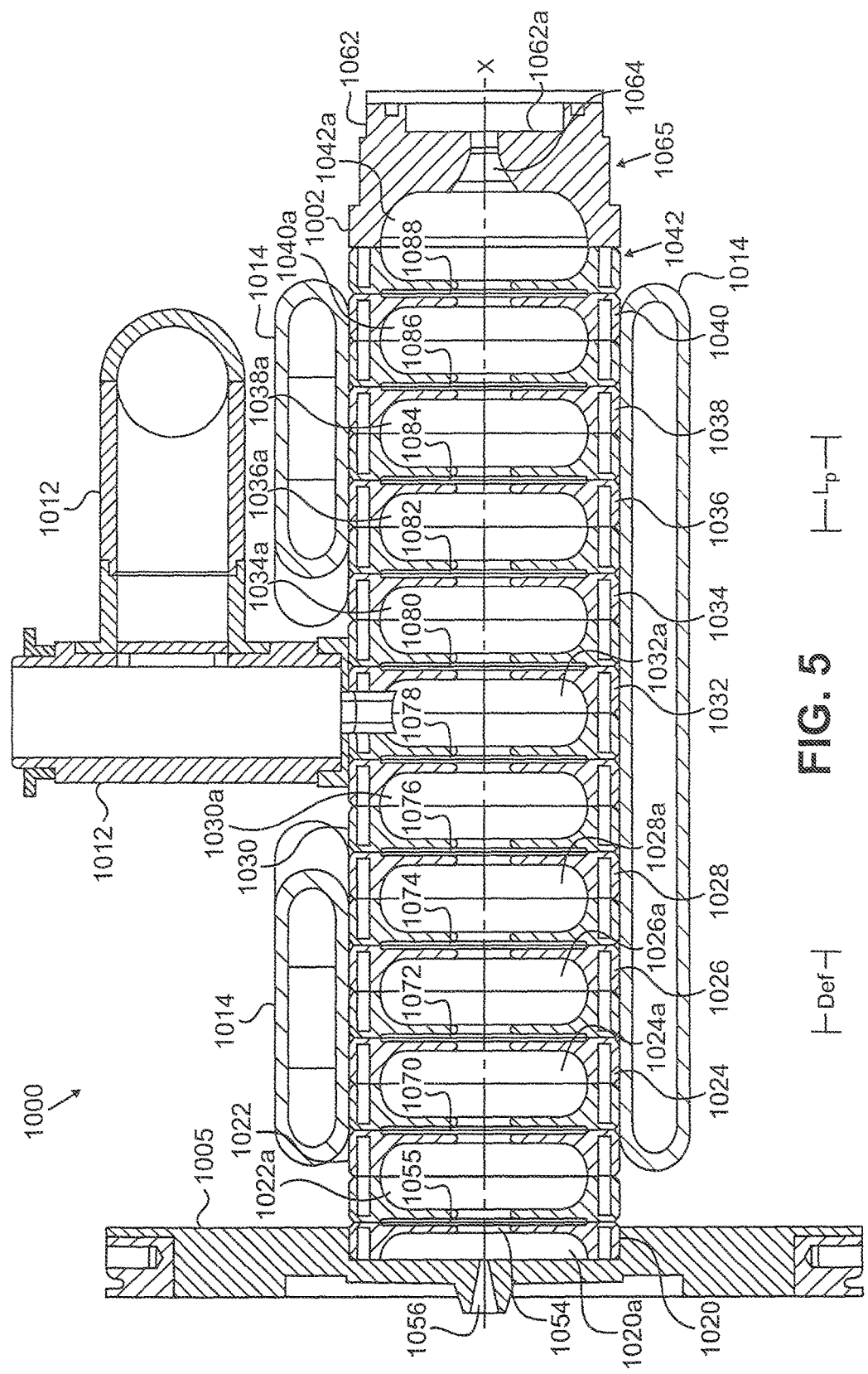
FIG. 5 is an axial sectional view of the accelerator of FIG. 4, excluding the electron gun and target assembly, to simplify illustration.

FIG. 5 is an axial sectional view of the accelerator 1000 of FIG. 4, excluding the electron gun 1004 and target assembly 1006, to simplify illustration. In this example, the accelerator body 1002 comprises a chain of cells 1020-1042 defining respective electrically coupled resonant accelerating cell cavities 1020*a*-1042*a*. The first cell 1020 is a buncher cell, which defines a buncher cell cavity 1020*a* configured to bunch and focus the injected electrons to form a beam and to establish its size. Buncher cells are generally described in U.S. Pat. No. 6,864,633, for example, which is assigned to the assignee of the present invention and is incorporated by reference herein. Ten (10) full, in-line, periodic electrically coupled resonant accelerating cells 1022-1040 follow the buncher cell 1020 in this example. The term "periodic" as used herein means that the accelerating cavities 1022*a*-1040*a* defined by each respective cell 1022-1040 have the same dimensions. The waveguide 1012, which couples the magnetron 126 to the accelerator body 1002, is coupled to the sixth full accelerating cell 1032, in this example. The final cell 1042 defines an output cavity 1042*a*, from which accelerated electrons exit the accelerator body 1002.

The buncher cell cavity 1020*a* is defined by the anode plate 1005 and the buncher cell 1020, which is a half-cell. The anode plate 1005 defines an output of the electron gun 1004, which in this example tapers to a narrow aperture 1056. The aperture 1056 is inwardly tapered toward the buncher cell cavity 1020*a*, in this example, and may have an diameter of 0.0050 inch (0.13 mm), for example. Such a small diameter facilitates a rapid creation of the electromagnetic field in the buncher cell. The small aperture 1056 has also been found to "scrape" off the outer electrons in the electron beam, reducing the electron beam current and diameter. About half of the electrons may thereby be removed. This reduces the peak power requirements of the accelerator 122 and introduces a smaller diameter electron beam to the buncher cell 1020. Enlarging the diameter of the aperture 1056 to 0.080-0.100 inches (0.2 mm-2.5 mm) provides higher current and better transmission. If such a larger aperture 1056 is used, the buncher field step (discussed below) may need to be adjusted.

The buncher half-cell 1020 includes an iris or opening 1054. The cross-section of the buncher half-cell 1020 is shown enlarged in FIG. 6*a*. A shallow cavity 1055 is provided on an opposite side of the buncher half-cell 1020*a* as the cavity 1020*a*. The iris 1054 electrically and physically couples the cavities 1020*a*, 1055, allowing for the passage of RF energy and an electron beam, as is discussed further below. The cavity 1020*a* of the buncher half-cell 1020 faces the anode plate 1005. The buncher half-cell 1020 is partially received within a recess 1005*a* in the anode plate 1005.

In this example, the maximum diameter D1 of the buncher cell cavity is 26.71 mm; the diameter D2 of the iris 1054 is 6.52 mm; the maximum diameter D3 of the coupling cavity 1055 is 26.65 mm; the depth De1 of the buncher cell cavity 106 is 3.32 mm; the depth of De2 of the coupling cavity is 0.49 mm; the depth De3 of the iris of 1052 is 1.0 mm; and the length $L_b$ of the buncher cell 1053 is 4.81 mm.

Figure 6A:
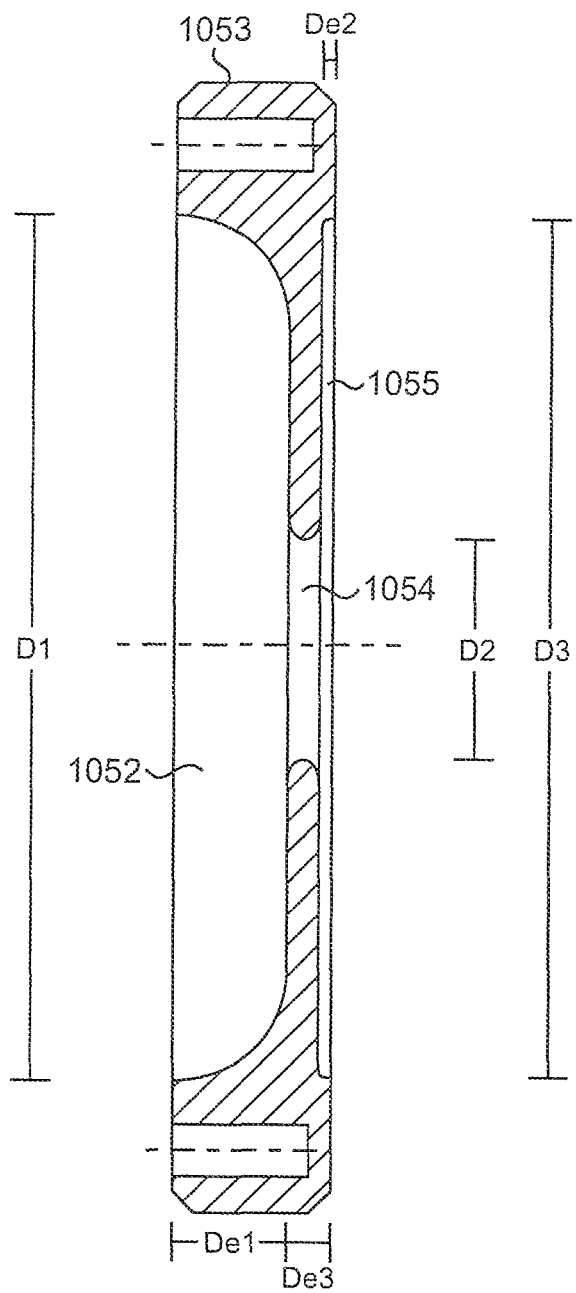
FIG. 6a is an enlarged sectional view of a buncher half-cell of FIG. 4.
Figure 6B:
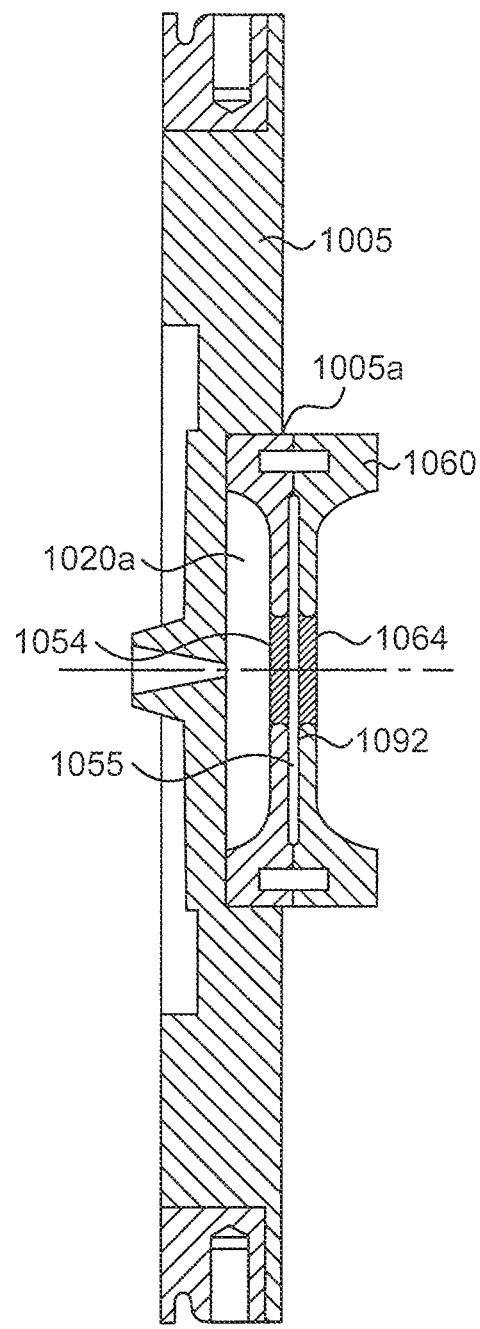
FIG. 6b is an enlarged sectional view of a half-cell connected to the buncher half-cell, of FIG. 4.
Figure 7:
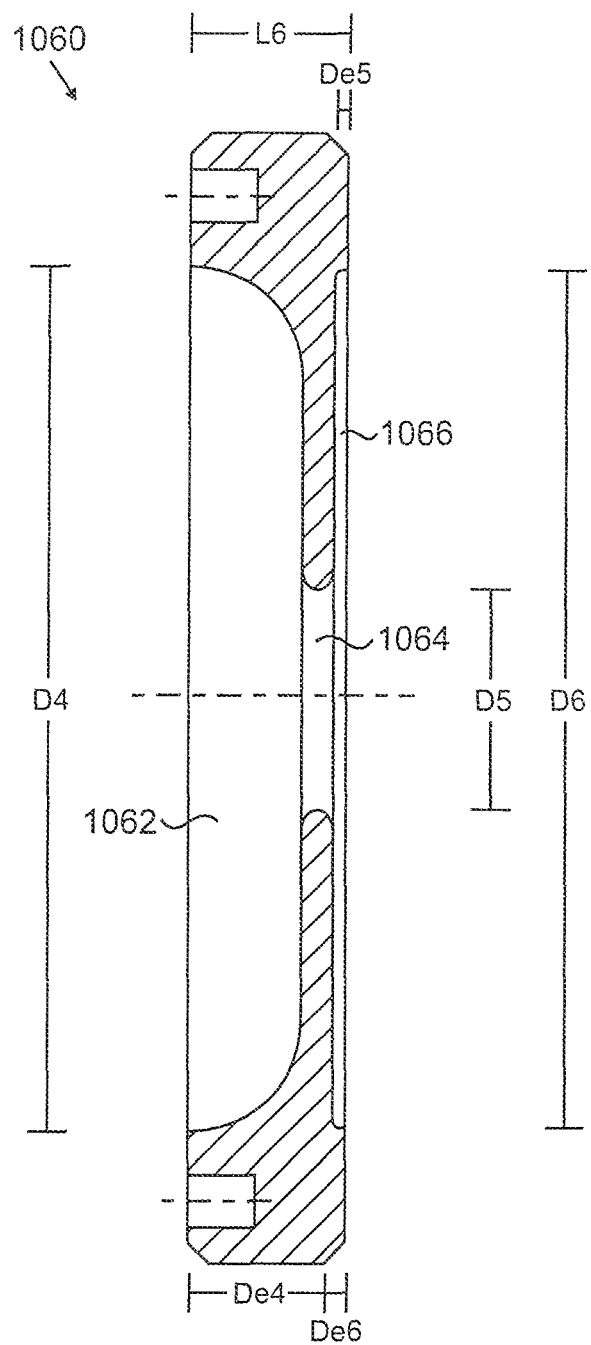
FIG. 7 is an enlarged sectional view of a half-cell of FIG. 4.

Each half-cell 1060 includes a first, deep cavity 1062, a beam tunnel iris or opening 1064, and a second, shallow cavity 1066 on an opposite side of the half-cell 1060 of the first, deep cavity 1062 and facing an opposite direction, as shown in FIG. 7. The full accelerating cavities 1022*a* are formed by identical facing cup shaped half-cells 1060, one of which is shown enlarged and in cross-section in FIG. 6*b*, and another of which is shown in FIG. 7. The shallow cavity 1055 of the buncher cell 1020 is attached to the shallow cavity 1066*a* of the first half-cell 1060*a* of the first resonant cell 1022 to form a full coupling cavity 1055, as shown in FIG. 6*b*. As shown in FIG. 5, the half-cells 180 are joined such that a first, deep cavity of one cell faces a first, deep cavity of an adjacent facing cell and a second, shallow cavity of one cell faces a second, shallow cavity of another adjacent cell. The matching larger cavities form the full cells 1022-1040 and accelerating cavities 1022*a*-1040*a*, while the matching shallow, second cavities form the coupling cavities 1070-1088. The irises 1064 and the coupling cavities 1070-1088 electrically and physically couples the cavities 1062, 1064, allowing for the passage of RF energy and an electron beam, as is discussed further below.

In this example, each half-cell 1060 defines a deep cavity 1062 having a maximum diameter D4 of 27.07 mm and a cavity depth De4 of 4.78 mm; an iris 1064 having a diameter D5 of 6.44 mm and an iris depth De6 of 0.49 mm; and a coupling cavity 1066 having a maximum diameter D6 of 26.65 mm and a cavity depth De5 of 0.49 mm.

The irises 1054, 1064 of the buncher cell 1020, the accelerating cells 1022-1040, and the output cell 1042, are aligned with the axis X of the aperture 1056 of the electron gun 1008 to form a tunnel for passage of an axial electron beam (not shown) through the accelerator body 1002, as shown in FIG. 5. The full resonant cells accelerate the electrons injected by the electron gun while the coupling cells 1070-1088 electrically couple the accelerating cavities 1022*a*-1040*a* to each other. The sum of the accelerations in each cavity 1020*a*-1042*a* add in the aggregate to the desired energy of 0.93 MeV-0.94 MeV, in this example.

The output end 1065 of the accelerator body 1002 is defined by a full cell 1042, which is formed in this example by another half-cell 1060 and a larger, deeper half-cell 1062 facing the half-cell 1060. For example, the half-cell 1060 may have a depth of about 4.78 mm and the deeper half-cell 1062 may have a depth of about 7.39 mm. A tapered passage 1064 extends from the half-cell 1062 to the target assembly 1006, which is coupled to the output end 1065. The tapered passage 1064 is dimensioned to intercept outlying electrons where cavity tuning will be less affected by heat.

Figure 8A:
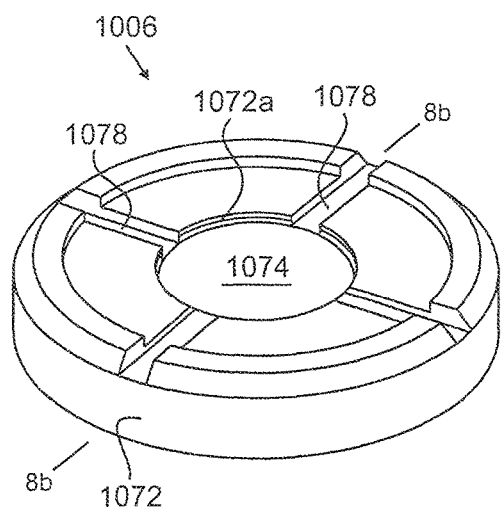
FIG. 8a is a perspective view of an example of a target assembly for use with the accelerator of FIGS. 4 and 5.
Figure 8B:
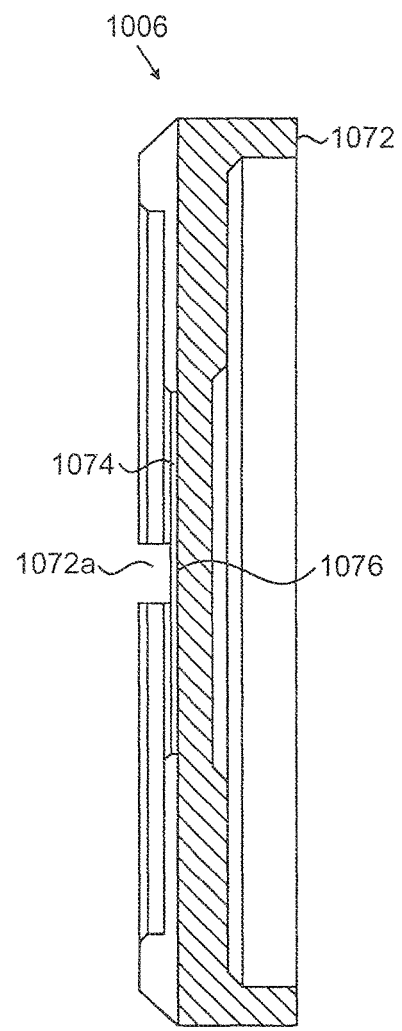
FIG. 8b is a sectional view of the target assembly of FIG. 8a, through line 8b-8b.

The target assembly 1006 (not shown in this view) fits within the recess 1062*a*. FIG. 8*a* is a perspective view of an example of the target assembly 1006. FIG. 8*b* is a sectional view of the target assembly 1006 of FIG. 8*a*, through line 8*b*-8*b*. In this example, the target assembly 1006 comprises a copper substrate 1072 supporting a tungsten button 1074 in a cavity 1072*a*. The tungsten button 1074 is brazed to the copper substrate by a copper/gold braze 1076. The braze 1076 may comprise 35% copper/65% gold, for example. Grooves 1078 may be provided in the copper substrate 1072 through which gas is pumped to create a vacuum and avoid a virtual leak, as is known in the art. In one example, the tungsten button 1074 is 2 thousandths of an inch (0.05 mm) thick and has a diameter of 0.3 inches (7.6 mm). Usually, tungsten target buttons are 10 thousandths of an inch thick (0.25 mm). It has been found, however, that a tungsten target button with a thickness of less than 10 thousandths of an inch (0.25 mm) provides higher radiation yield. For example, progressively better yield may be obtained with button thicknesses of less than 0.20 mm, 0.15 mm, and 0.10 mm, such as 0.05 mm. In this example, use of a tungsten button 1074 with a thickness of 0.05 mm increased the yield by about 50% compared to a tungsten button of 0.25 mm. The higher yield increases the radiation dose, enabling faster imaging. This is advantageous, especially where the total imaging time may be limited due to battery capacity. The braze is 1-2 thousandths of an inch thick (0.025-0.05 mm). The target button 1074 and other components of the target assembly 1070 may comprise other materials, instead of or in addition to those noted here, as is known in the art. The target assembly 1070 may also be mounted on a ceramic spacer to provide electrical insulation and to permit monitoring of target current, as is known in the art.

While it is common in accelerators for the cell cavity lengths to increase from cell to cell, in this example, the cell cavity length is kept the same, except in the buncher cell cavity 1020a and the output cell cavity 1042a. This facilitates manufacture and assembly of the half-cells, since only one size half-cell 1060 is needed (besides the buncher cell 1020 and output cell 1042). All the half-cells 1060 are therefore interchangeable. However, cell lengths may be varied, if desired.

As shown in FIGS. 4 and 5, an optional cooling and/or heating tube 1014 extends along portions of the exterior surface of the accelerator body 1002. If such a cooling tube 1014 is to be used, then a water pump may be set up next to the third module 108 at the site and coupled to the cooling tube, as discussed above. The water pump could weight about 100 lbs (45 kg) or less, which may be provided in a fourth module, or the first module 102, if desired. The cooling tube 1014 may be made of copper and have an outer diameter of ⅜ inch (9.52 mm) and a wall thickness of 0.065 inch (1.65 mm). The pump may pump water at a rate of 1 to 2 Us, at 20° C.-40° C., for example. The cooling and/or heating tube 1014 may be used for testing of the accelerator 1000, as well.

Instead of or in addition to the cooling tube 1014, cooling fins 1016 may be provided around the accelerator body 1002 for cooling. In FIG. 4, two rear cooling fin assemblies 1150a, 1150b are shown. Two forward cooling fin assemblies 1150c, 1150d are shown in part, in phantom. In this example, each assembly comprises fourteen fins 1016 brazed to the accelerator body 1002 forming 13 ducts for air passage. The fins 1016 in each assembly 1150a, 1150b, 1150c, 1150d are covered by a respective solid outer casing 1154. The fins 1016 are separated by a distance of 0.3 cm in this example. Each fin has an inner diameter of 36 mm, and an outer diameter of 96 mm. Each assembly may extend 120° around the accelerator body 1002, for example.

One or more fans may be provided in the third module 106, to draw air into and through the third module 106, over the cooling fins 1016. As discussed above with respect to FIG. 2, two inlet vents 176a, 176b, each containing a fan 178 may be provided. One or more guides may be coupled to or adjacent to the cooling fin assemblies 1150a, 1150b, 1150c, 1150d to guide air drawn into the third module 108, across the fins 1016, as discussed below with respect to FIG. 9. Each fin 1014 may be made from 0.015 inch (0.38 mm) thick copper sheet. The fins 1014 may be assembled into the assemblies 1150a-1150d with a copper/gold braze and brazed to the accelerator body 1002 by a copper/silicon (Cusil) braze. The total weight of the four fin assemblies 1150a-1150d is about 1 lb (0.45 kg). Fins may be arranged longitudinally along the accelerator 1002, instead.

Figure 9:
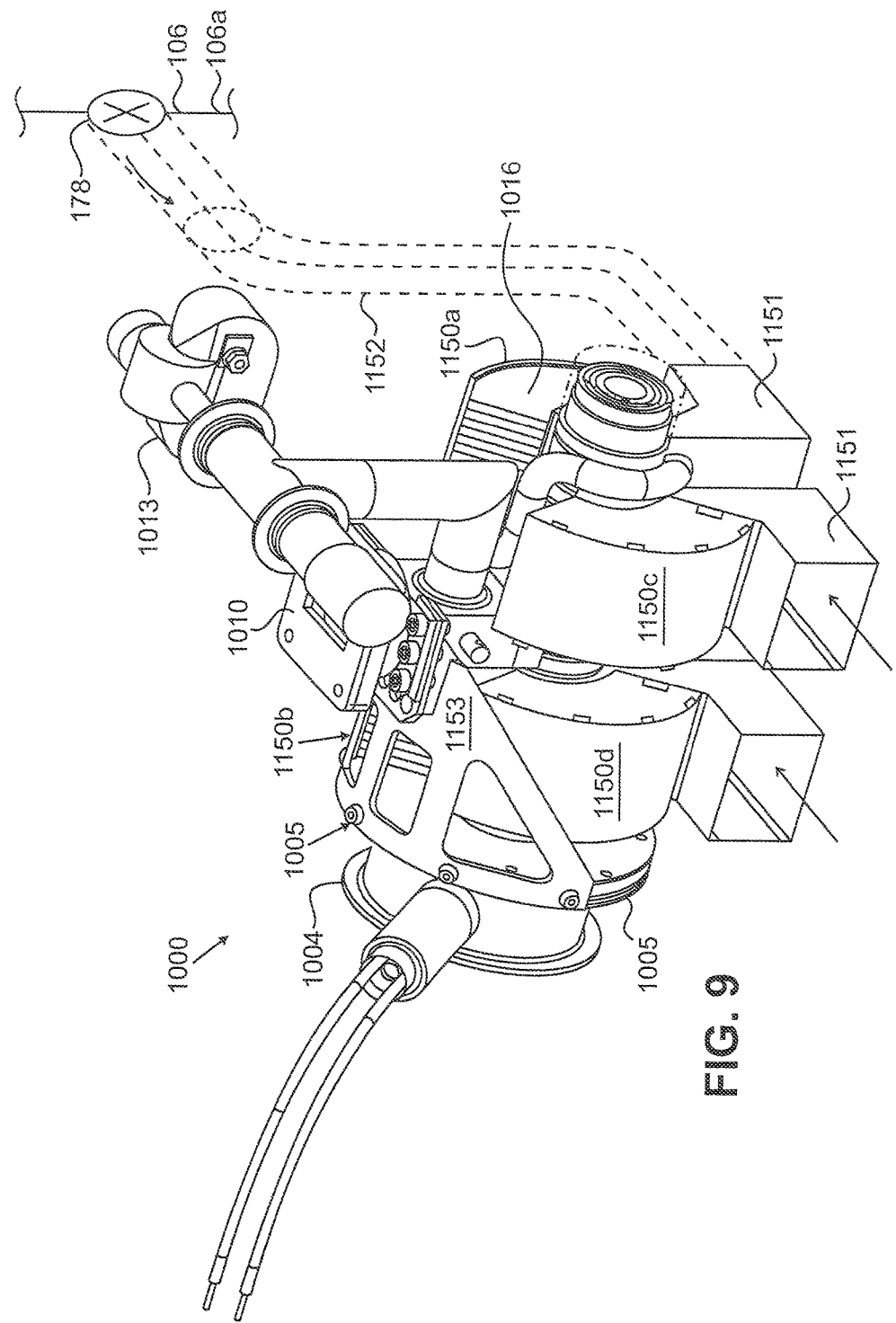
FIG. 9 is a perspective view of another example of an accelerator with guides coupled to respective cooling fin assemblies.

FIG. 9 is a perspective view of another example of an accelerator 1000, with respective guides 1151 coupled to respective cooling fin assemblies 1150a, 1150d, 1150c. The guide coupled to the cooling fin assembly 1150b is not visible in this view. Air drawn into the third module 108 enters a first, open end of each guide 1151 along the arrows and exits the guides into the ducts between the fins 1016 at the lower portions of the cooling fin assemblies 1150a, 1150b, 1150c, 1150d. The air exits the upper portions of the ducts at the top of the cooling fin assemblies 1150a, 1150b, 1150c, 1150d, carrying away heat from the fins 1016 and accelerator 1002. Air drawn into the third module 106 by one or more fans 178 may flow into the guides 1151. Alternatively, the guides 1151 may be coupled to a fan or fans by ducting. In one example, a 3.5 inch (9 cm), 120 CFM fan draws air into a duct with a four way splitter. Four ducts extend from the splitter, one to each guide 1151. An example of a duct 1152 connected to a fan 178 in a vent in a wall 106a of the third module 106 is shown in phantom, coupled to one of the guides 1151. It is noted that in FIG. 9, the vacuum pump 1013 is rotated 90° with respect to the orientation of the pump 1013 in FIG. 4, to accommodate the guides 1151. FIG. 9 also shows a support 1153 bolted to the waveguide 1007 and the anode plate 1005, to support the anode plate.

Louvers and/or vents may be provided on the third module 106 for additional cooling along with or instead the cooling tube 1014 and/or the cooling fins 1016. The third module 106 may also comprise resistive heaters, if needed, for use in cold environments. Louvers and/or vents may also be used for heating in cold environments.

The magnetron 126 in this example, which provides microwave power to the resonant cells within the accelerator 1002, is a modular, X-band (9.3 kHz) magnetron, with a motor activated mechanical tuner to adjust frequency, and filament leads powered to heat the cathode surface, permitting microwave emission. X-band magnetrons used with X-band accelerators generating X-ray radiation typically generate a power of 1-1.5 MW. To reduce weight in this example, the accelerator 1002 is designed to accelerate electrons to the desired energy (in this example 0.93-0.94 MV, 1 rad/min) with a lower power magnetron 126. In this example, the magnetron 126 generates a peak output of less than 400 KW, an average power of 200 W, at a duty cycle of 0.0005.

The power of the magnetron 126 in this example is about 340 KW, at a voltage of 28 KV and a current of 29 Amps. Due to losses in the waveguide 1012, the peak power at the accelerator 1002 is less than about 320 KW and the average output power is less than about 200 W. The magnetron 126 may weigh about 10 pounds (4.5 kg), for example.

The accelerator 1002 is designed to operate at about 290 KW, providing a wide margin that has been found to avoid the need for mechanical tuning. Prior art accelerators typically require mechanical tuning or polishing of cells to establish accurate an resonant frequency plane. Tuning may be provided in any particular configuration, if needed.

Figure 10A:
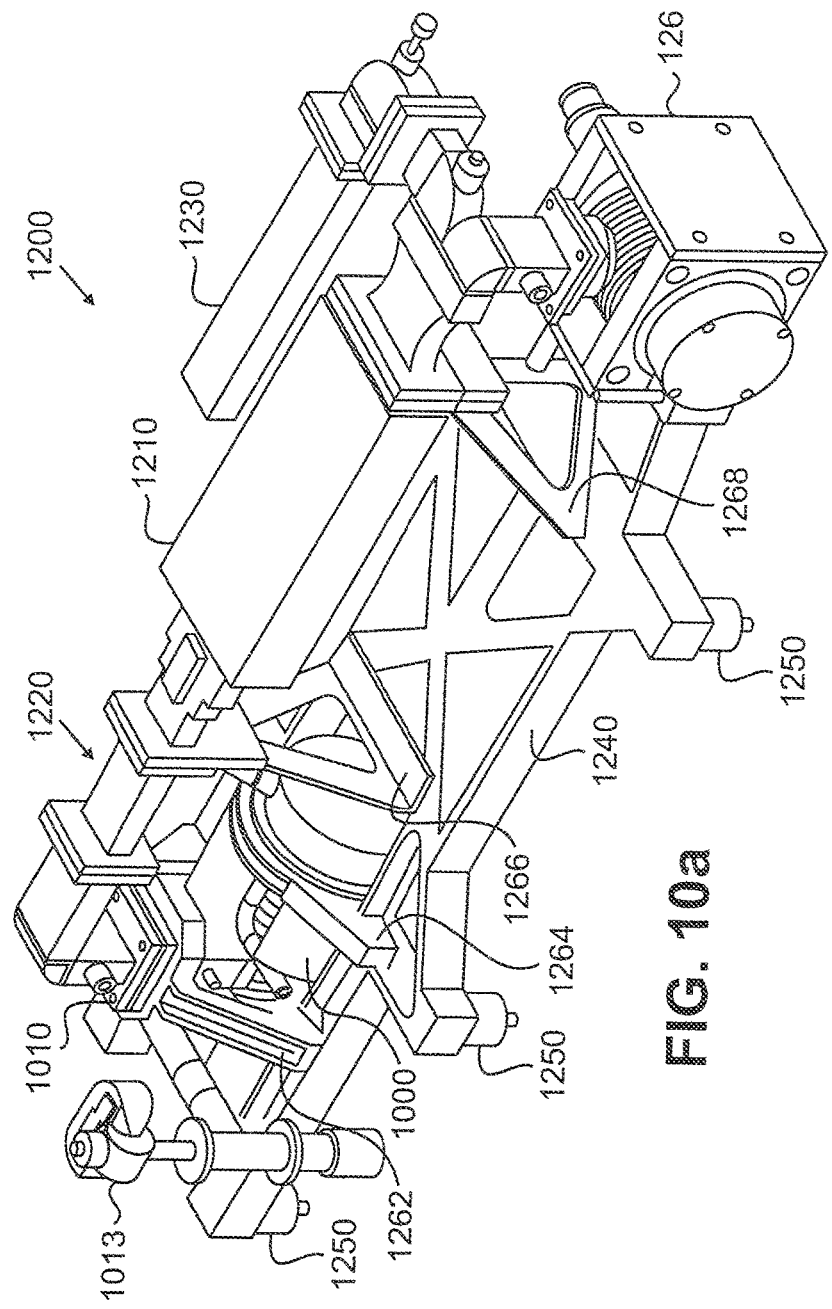
FIG. 10a is a perspective view of an assembly comprising the magnetron and the accelerator, coupled to a strong back.

FIG. 10a is a perspective view of an assembly 1200 comprising the magnetron 126 coupled to the accelerator 1000. A circulator 1210, which controls the flow of microwave fields, is coupled to the magnetron 126 by an E-plane bend. The circulator 1210 is coupled to the accelerator body 1002 through a length of waveguide 1220 that is coupled to the waveguide window 1010 shown in FIG. 4, through a second E-plane bend. A dry load 1230 is coupled to the circulator 1210 through an H-plane bend. The dry load 1230 absorbs reflected waves from the circulator 1210, as is known in the art. The circulator 1210 may be an Isolator RF System, 3 GHz, 240 kWp, 120 Wavg, WR 112, circulator from Advanced Ferrite Technologies, Germany, Part No. 1-0930020503, for example, which weighs about 5 lbs (2 kg).

Figure 10B:
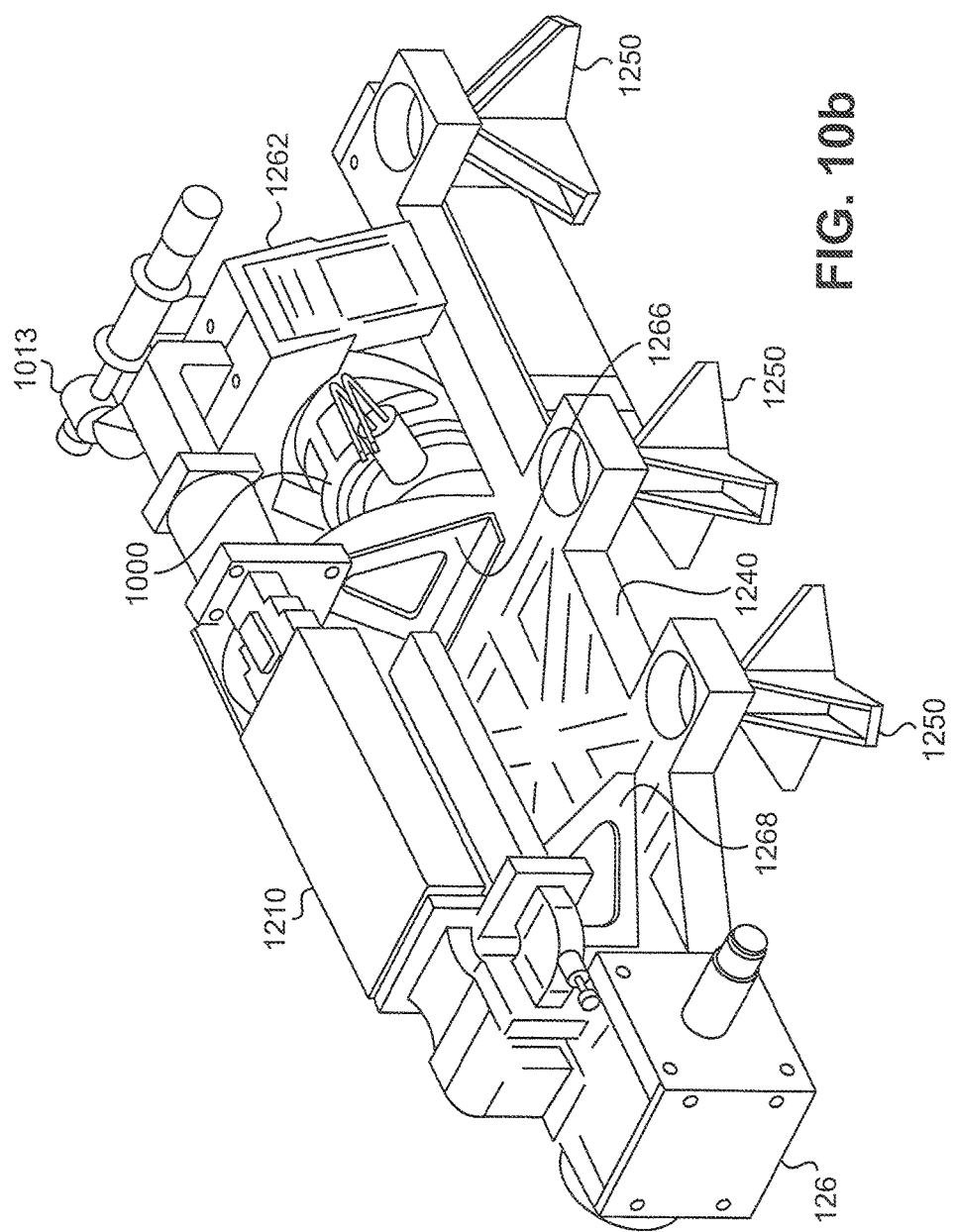
FIG. 10b is another example of the assembly supported by another strong back.

In this example, the magnetron 126, circulator 1210, accelerator body 1002, and associated components are coupled to a support or "strong back" 1240 of a rigid, light weight metallic or composite material, such as aluminum, by four brackets 1262, 1264, 1266, and 1268. Elastomeric isolators 1250, such as metallic or plastic springs or elastomeric material, for example, are also provided to isolate vibrations when the assembly 1200 is mounted in the third module 106. Suitable elastomeric isolators may be obtained from Lord Corporation, Cary, N.C. For example, 206 steel multiplane platform mounts, Part Number 206P-45, may be used. According to Lord Corporation, these platform mounts, which comprises an inner portion of specially compounded rubber and an outer portion of cold rolled steel, have a maximum axial rated load of 3/16 inch (4.80 mm) deflection of 45 lbs (200 N), and an axial spring rate of 240 lbs/in (42.0 N/mm). FIG. 10b is another example of an assembly 1240 supported by another strong back configuration, in which three brackets 1262, 1266, and 1268 connect the accelerator 1000 magnetron 126 and associated components to the strong back 1240. Elastomeric isolators 1250 are also shown, having a different configuration than those in FIG. 10a. The strong back 1240 and isolators 1250 may weigh from about 3 lbs (1.36 kg) to about 10 lbs (4.5 kg) in total, for example.

The magnetron 126 may be a VMX 3045 magnetron available from CPI Beverly Microwave Division, Beverly, Mass. According to Company specifications, the VMX 3045 weighs 9.9 lbs (4.5 kg), has a rated maximum output of 380 kW and is operable at a duty factor of 0.0005.

Other commercially available magnetrons that may be used include the VMX 1131 Magnetron available from CPI Beverly Microwave Division, Beverly, Mass. According to company specifications, the VMX 1131 has a rated peak output of 325 kW, and typical performance at a level of 400 KW. It is said to be rated an X-band coaxial magnetron operating over a frequency of 8.5 GHz-9.6 GHz. It is also said to be rated at a duty cycle of 0.001 and 3.5 milliseconds, an anode voltage of 29 KV, an anode current of 30 A, and a 9 volt heater with a power output of 14 A. It is air-cooled by a fan and is mechanically tunable. The VMX 1131 requires 30 A, 29 KV at 320 KW and weighs 17 lbs (7.7 kg). The VMX 1131 is said to be operable after 3 minutes warm-up at air into a matched load in the temperature range of from about −55° C. to about 270° C., 40 cfm air. It has been found to operate into an accelerator at about 5 to about 30 psi $SF_6$.

The magnetron 126 may also be a CalTube PM-1100X, a CalTube PM-1000X, or a CalTube PM-325X, provided by CalTube Labs, a unit of L3 Communications Applied Technologies, Watsonville, Calif., for example, which weigh 35 lbs (16 kg). According to specifications provided by CalTube Labs, the CalTube PM-1100X is rated at 1.5 MW peak output at 36 kV and 80 A, with 0.001 duty cycle. It is tunable over +/−25 MHz, employs an integral permanent magnet. It requires a nominal 0.66 gpm water cooling. As discussed above, a water pump may be set up proximate to the third module 106 if needed. It has a 300-second warm-up time. Also according to specifications provided by CalTube Labs, the CalTube PM-1000X is rated at 1.2 MW for 32 kV-80 A and 0.0007 duty cycle; and the CalTube PM-325X provides 325 kW peak power with 28 kV-35 A at 0.001 duty cycle.

The pulse transformer 128, shown schematically in FIG. 1, is coupled to the electron gun 1004 and the magnetron 126, permitting use of a lower voltage on the cable connectors, improving their reliability and durability. A suitable pulse transformer 128, weighing about 10 lbs (4.5 kg), is available from Stangenes Industries, Inc., Palo Alto, Calif., for example.

The power of the magnetron 126 and the electron gun 1004 may be selectively varied in this example to vary the dose rate of the radiation beam from about 0 to about 2 rads/min, at 1 meter, a depth of dose maximum (dmax). The power may be controlled by the controller 108 under the control of the pendant 110, for example.

The weight of the X-ray head 118 in this example is from about 35 lbs (16 kg) to about 55 lbs (25 kg) or 60 lbs (27 kg). If the Storm Case IM 2950 170 is used, for example, the third module 106 would weigh from about 55 lbs (25 kg) to about 75 lbs (34 kg) or 80 lbs (36 kg), which may be readily carried by one or two people.

A man-portable radiation scanning source 100 in this example would therefore weight from about 200 lbs (91 kg) to about 250 lbs (113 kg), depending on the case 170. A man-portable radiation scanning system 100 including such a man-portable radiation source 100 and a digital imager may therefore weigh from about 235 lbs (107 kg) to about 300 lbs (136 kg).

In another example, only two modules are provided, the first module 102 and a second module containing the modulator 114 and the X-ray head 118. In this example, the second module could weigh from about 125 lbs (57 kg) to about 150 lbs (68 kg), which may be carried by two people to the site. Total system weight could be reduced by eliminating one case 107 and the cables necessary to couple the second module 104 to the third module 106. Placing the modulator 114 closer to the X-ray head 118 also reduces power losses along long cables.

Operation

In operation, microwave energy generated by the magnetron 126 is provided to the cavities 1020a-1042a of the accelerator body 1002, via the rectangular opening 1010a of the waveguide 1010, which in this example is coupled to the sixth accelerating cavity 1032a. (See FIGS. 4 and 5).

The microwave energy propagates through the accelerator body 1002, from one cavity 1020a-1042a to the next, through the coupling cells 1055-1088, setting up alternating positive and negative portions of standing electromagnetic waves in the buncher cell 1020, the full accelerating cell cavities 1022a-1040a, and the output cell cavity 1042a. The standing waves pass through zero in each coupling cell 1055-1088. A high voltage pulse is applied to the electron gun 1004 by the modulator 114 in the second module 104 via a high voltage connector 1004a, as is known in the art.

The aperture 1056 focuses electrons from the electron gun 120 as they enter the buncher cell 1020. The electrons are accelerated by the time varying electromagnetic standing waves in the buncher cell cavity 1020a. Since the electrons are only accelerated half the time in the field in the buncher cell cavity 1020a, the electrons "bunch." The phase at which they bunch, the capture fraction, and the radial focusing of the electrons are determined by the cell geometry, which is discussed in more detail, below. The electron beam converges as it enters the buncher cell 1020. As the beam diverges within the buncher cell cavity 1020a, it receives a focusing "kick" by radial forces generated by the standing electromagnetic waves in the buncher cell cavity 1020a. The beam then passes through the iris 1064 into the first full cell cavity 1022a, where it diverges again. Radial forces of the standing electromagnetic waves in the first cell cavity 1022a again focus the beam. The beam is also accelerated by longitudinal forces caused by the standing electromagnetic waves in the cell. The electron beam then passes through the downstream iris 1064 of the first full resonant cell 1022 into the second full cell cavity 1024a. The diverging of the beam, the focusing of the beam, and the acceleration of the beam are repeated in each subsequent accelerating cavity 1022a-1040a, and the output cavity 1042a.

The phase of acceleration need not be perfect in the buncher cell cavity 1020a, the first cell cavity 1022a, and the subsequent cell cavities 1024a-1042a. Instead, in one embodiment, the phase is optimized such that, for equal length cells, the net phase-error over the length of the accelerator body 1002 is minimized and the spectrum is thereby narrowed, providing for efficient conversion of microwave energy into X-rays. In the known prior art, in contrast, phase optimization is attempted in each cell cavity. This typically requires a multiplicity of unique parts, including a plurality of different sized cells, which increases design complexity and cost. Such accelerators may also be more sensitive to manufacturing and operating parameters. As discussed below, the structure of the parameters of the accelerator 1000 are adjusted to provide stable operations with low sensitivity to manufacturing and operating parameters. It is noted that focusing is achieved in this example without an external solenoid, reducing the size and weight of the accelerator 1000. An external solenoid may be provided, however, if the additional size and weight of the accelerator 122 may be tolerated.

The standing waves accelerate the electrons as the electrons pass through each cell cavity 1022a-1042a. The acceleration per cell cavity and number of cell cavities are arranged to provide the electrons with the desired peak acceleration. In this example, the cell cavities 1022a-1042a accelerate the electrons to the desired 0.93 MeV-0.94 MeV. Since low power is used to reduce the size and weight of the modulator 114 and the X-ray head 118, including the accelerator 1002 and the magnetron 126, the electrons in the electron beam are accelerated slowly. In this example, ten (10) full accelerating cells 1022a-1040a are required to accelerate the electrons to the desired energy.

The accelerated electrons exit the accelerator body 1002 through the output cell 1042 and the passage 1064, toward the tungsten button 1074 in the target assembly 1006. Impact of the accelerated electrons with the tungsten button 1074 generates radiation having a peak energy of about 0.93 MeV-0.94 MeV, by the Bremsstrahlung effect. Unless collimated, the generated radiation beam will be emitted from the tungsten button 1074 and out of the third module 108 in all directions.

The half value layer ("HVL"), which is the length of steel required to reduce an X-ray dose or intensity by one-half, is an indication of the energy of the X-ray beam and the quality of the X-ray spectrum. In this example, the X-ray radiation generated by the radiation source has an HVL ("HVL") of from about 0.57 inches (14.5 mm) to about 0.62 inches (15.7 mm) with power peaking the spectrum at about 0.9 MV. Operating at 250 Hz and pulse-width of 2 us, for a duty cycle of 0.0005, the dose-rate output in a 10 cm×10 cm field at 1 m, with probe at $d_{max}$ in solid-water, is in the range of 1 R/m. An 18 gauge (7 mm diameter) copper wire may be imaged through 3 inches (7.6 cm) of steel, with a wide variety of commercially available X-ray film, as well as a digital panel.

The HVL is affected by the "quality" of the X-ray spectrum, which refers to the spread of the energy spectrum. To achieve this HVL with the man-portable X-ray source 100 in this example, the electron beam has a relatively narrow energy spectrum. In this example, 40% of the electrons in the electron beam lie within 6% of the peak acceleration energy of 0.93 MV-0.94 MV.

A second figure of merit used to quantify the operation of an accelerator is the mean of the energy $E^n$ raised to the 1/nth power ($<E^n>^{1/n}$), where E is the energy in MV and n=2.7, compared to the peak energy in the spectrum. This value determines the X-ray dose output, according to yield $Y=0.07I_{avg}E^{2.7}$, where $I_{avg}$ is the average current in microamps, and the yield is expressed in Rad/min/microamp. This value has also been found to correlate well with the HVL figure for the X-ray beam, which is also an aggregate measure. Depending on the operating power of the magnetron 126 and the electron gun 1004, this figure is over 0.64 MV or 72% of the peak. Considering the size, weight, and power constraints on the accelerator 1002, this is a very "tight" radiation beam.

Another factor affecting the HVL is spot size of the electron beam on the target. In this example, the spot size of the radiation beam, which encompasses 75% of the electron beam on the target, has a diameter of less than 2 mm.

Three ratios related to the structure and operation of the accelerator 122 also contribute to achieving the desired HVL and spot size in this example. One is the ratio a between the peak amplitude of the field in the first full cell cavity 1022a to the peak amplitude of the field in the buncher cell cavity 1020, referred to herein as the "field step ratio," the second is the ratio between the length $L_b$ of the buncher cell cavity 1020a and half the free space wavelength ($\lambda/2$), referred to herein as the "buncher cell ratio," and the third is the ratio between the cell cavity period $L_p$ and half the free space wavelength ($\lambda/2$), referred to herein as the "cell period ratio."

The field step ratio a affects the balance between focusing and defocusing of the electron beam from the buncher cell 1020 to the first cell 1022. The field step ratio a also affects the phase of the electrons exposed to the standing electromagnetic fields in the downstream cells. In one example, the peak field ratio is greater than one (1) and less than two (2). For example, the peak field in the buncher cell may be about 70% of the peak field in the first full cell cavity 1022a, or the ratio may be from about 1.2 to about 1.5, such as from 1.3 to 1.4, for example.

Figure 11:
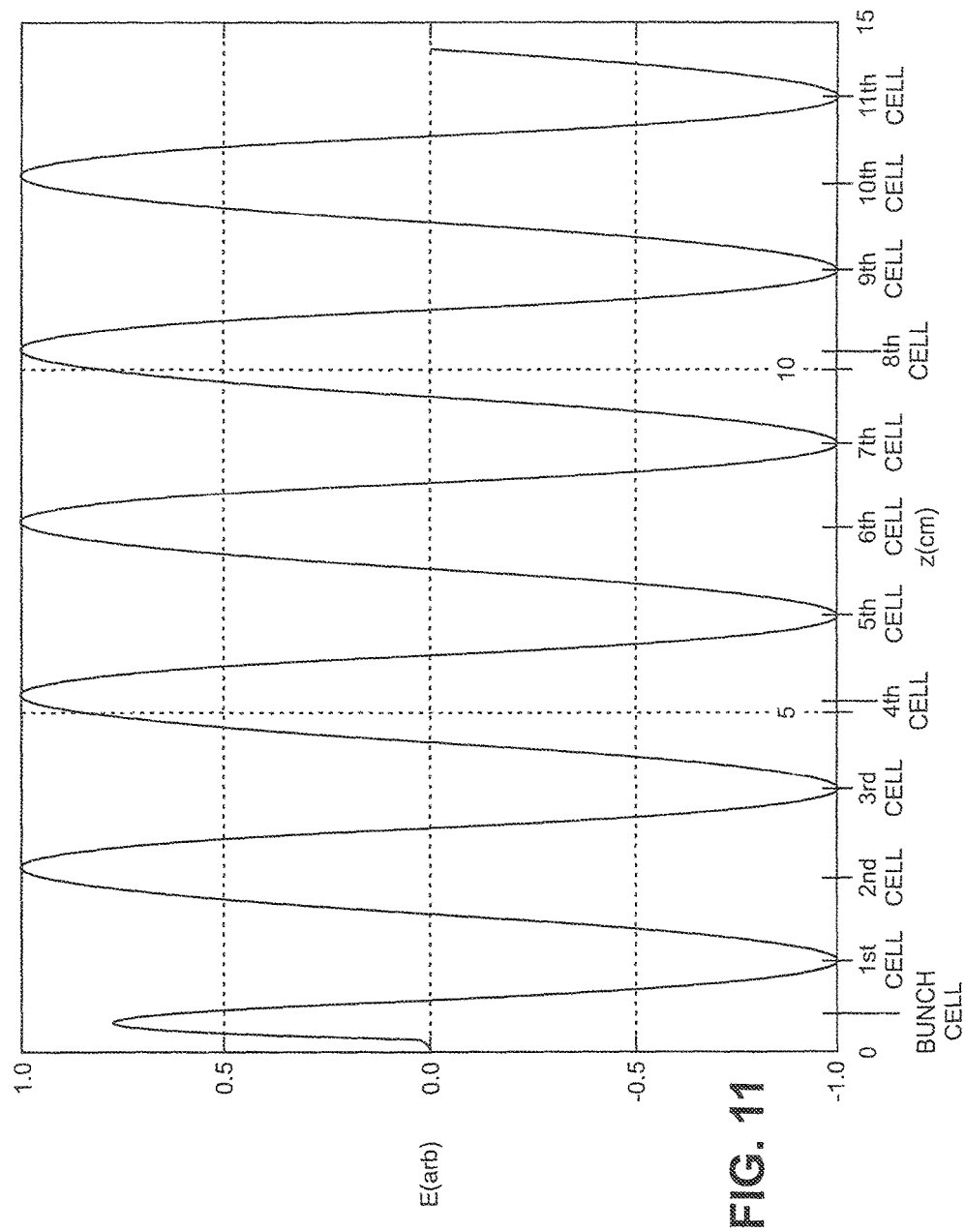
FIG. 11 is a graph of energy E (arbitrary) versus Z (cm) for the accelerator.

FIG. 11 is a graph of energy E (arbitrary) versus Z (cm) for the accelerator 1000. The energy is normalized to vary from 1.0 to −1.0. Z (cm) corresponds to the distance from the tapered aperture 1056. The cell corresponding to the distance Z is also indicated. The peak energy in the buncher cell cavity 1020a is near the anode plate 1005. The peak energy in each full cell cavity 1022a-1042a is found at a distance Z from the tapered aperture 1056 to the center of each full cell cavity. The energy passes through zero (0) in each coupling cell 1055 and 1070-1088. As shown in FIG. 11, the peak energy of the field in the first buncher cell cavity is about 0.7 and the peak energy of the field in the first full cell cavity 1022 and subsequent cell cavities 1024a-1042a is +/−1.0. A field step ratio within these ranges has been found to launch the electron beam from the buncher cell cavity 1020a to the first full cell cavity 1022a at an appropriate phase for the selected cell cavity length (in this example from about 0.78$\lambda$/2 to about 0.82$\lambda$/2, where $\lambda$ is the free space wavelength) and the overall length of the accelerator 1000 (14.3 cm in this example). Use of such a field step ratio a to provide simultaneous control of spectrum size and spot-size has in the past been accomplished by varying slot length in side coupled cavities, as in U.S. Patent Publication No. US 2005/0134203A1, which issued on Jul. 15, 2008 bearing U.S. Pat. No. 7,400,093, for example.

In one embodiment, the field step ratio a is controlled by the diameter of the buncher iris 1054, which acts as a coupling element for the electromagnetic field propagating through the resonant cells 1022a-1042a. With a buncher cell cavity 1020a having a first diameter D1 and an iris 1054 having a second diameter D2, as indicated in FIG. 6a, varying the iris diameter to a third diameter to vary the field step ratio a changes the steady state amplitude in the buncher cell cavity 1020a. The inner diameter of the buncher cell cavity 1020 is therefore adjusted to correct the frequency shift resulting from the change in iris diameter. Alternatively, the field step ratio a may be controlled by introducing such a frequency error. In this example, the buncher cell iris diameter D2 is 6.52 mm and the buncher cell cavity maximum diameter D1 is 26.73 mm. The remaining cell cavities 1022a-1040a have maximum diameters D4 of 27.07 mm and iris 1066 diameters D5 of 6.44 mm, as indicated in FIG. 7.

The second ratio is between the length $L_b$ (see FIG. 6a) of the buncher cell cavity 1020a and half the free space wavelength ($\lambda/2$), which is referred to as the buncher cell ratio. The buncher cell ratio affects the relation between the phase of the electron beam in the buncher cell cavity 1020a and the phase of the field in the first full cell cavity 1022a, and focusing. The free space wavelength $\lambda$ at 9.3 GHz is 32 mm. The buncher cell length $L_b$ is in effect determined by the depth De1 of the buncher cell cavity 1020a, which, in this example, is less than the depth of the other cell cavities 1022a-1040a. This has been found in simulation to facilitate the arrival of the slow moving electrons injected into the buncher cell cavity 1020a, into the next cell cavity 1022a at optimal phase. In this example, where the gun voltage is low (29 kV-30 kV), the length $L_b$ of the buncher cell cavity is about ⅔ the depth De4 of the other cell cavities 1022a-1040a. In one embodiment, this ratio is less than one-half (½). In one example, the length $L_b$ of the buncher cell is 4.81 mm and the buncher cell ratio is 0.3 ((4.81 mm)/(½)(32 mm)=0.3).

The third ratio is between the cell period $L_p$ and half the free space wavelength ($\lambda/2$), which is referred to as the cell period ratio $L_p$ ($\lambda/2$), (where the cell period $L_p$ is the distance between the center of one accelerating cell to the center of an adjacent accelerating cell, as shown in FIG. 4). In one example, the cell period ratio $L_p/(\lambda/2)$ is adjusted to provide a sharp spectrum with the chosen field step ratio $\alpha$ and the second buncher cell ratio $L_b/(\lambda/2)$. Cell length $L_p$ affects the quality Q of the accelerator body 1000. Too short a cell length $L_p$ spoils the Q, resulting in increased power requirements at a given energy and requiring a more powerful modulator 114 and magnetron 126, increasing the size and weight of the X-ray head 118. In this example, the cell period $L_p$ between adjacent accelerating cavities 1022a-1040a is less than about one-half the free space wavelength ($\lambda/2$). With this relatively short cell length, electrons traveling well below the speed of light and accelerated in one cell will arrive at the next cell in the proper phase relative to the standing electromagnetic microwave field, for additional acceleration. The optimal available microwave cell period ratio will depend on the intended range of operating electron gun voltage, the desired energy of the electron beam, and the microwave power provided by the magnetron 126. In this example, the cell period ratio is less than 1 and greater than 0.70. The cell period ratio may be about 80% of ($\lambda/2$), such as from about 0.78 to about 0.82 of ($\lambda/2$), for example. The ratio is typically 1.0 in known high energy accelerators.

The actual cell period $L_p$ selected may depend on the field step ratio $\alpha$. If the field step ratio is 1.3 in the accelerator 1002 of this example, the cell period is 12.5 mm, and the cell period ratio is 0.78 ((12.5 mm)/(½)(32 mm)=0.78). Adjustment of the cell length in the design facilitates phasing of the electrons with the standing electromagnetic waves in the accelerator 1002.

The magnetron 126 is selected to drive the accelerator cavities 1020-1042 at the selected frequency. The frequency of the microwave energy is selected such that the chain of coupled resonant cells are excited by standing waves with less than $\pi/2$ radian phase between each coupling cell and adjacent accelerating or resonant cell (period length). In this example, the frequency is 9.3 GHz and the buncher diameter is 26.65 mm.

To provide a smaller and lighter accelerator 1000 with a good Q, such as 7700 in this example, cavity depth of the full resonant cell cavities 1022a-1040a is increased as much as possible at the expense of iris thickness and depth. In this example, the cavity depth is 4.78 mm in the half period cells and 3.32 mm in the buncher cell cavity 1020a. The iris thickness of each half-cell is small in this example (about 1 mm). This reduces the number of accelerating cells required to accelerate the electrons to the desired energy, and therefore the length.

As discussed above, the aperture 1056 scrapes off about half of the electron beam as the beam is injected into the buncher cavity 1020a. The capture fraction by the accelerator body 1002 is from about 10% to about 15%. The resulting lower beam current lowers the power requirements of the accelerator 1000, facilitating the size and weight reductions discussed above, and the use of batteries 110.

Summarizing certain dimensions and characteristics of components of the accelerator body 1002 in this example:
the accelerator body 1002 has an outer diameter of 35 mm;
the buncher cell cavity 1020a has a maximum diameter D1 of about 26.71 mm;
the buncher cell iris 1054 has a diameter D2 of about 6.52 mm;
the buncher cell cavity 1020a has a depth De1 of 3.32 mm;
buncher cell length $L_b$ is 4.81 mm;
each half-cell 1060 has an outer diameter of 35 mm;
the first full cavity 1022 has a maximum diameter D4 of about 27.07 mm (matching the maximum inner diameter of the half-cell 1060);
the first full cavity 1022 has a depth DeF (see FIG. 5) of about 9.56 mm (double the depth De4 of the half-cell 1060);
the coupling cavities 1055 and 1070-1088 have a maximum inner diameter D6 of about 26.65 mm (matching the diameter of the coupling cavities in the half-cells 1053, 1060);
the coupling cavities have depths of about 0.98 mm (double the depths De3, De6 of the buncher cell 1053 and the half-cells 1060);
the iris 1064 have diameters D5 of about 6.44 mm;
the circumferential edge of the iris in this example is radiused;
the thickness De6 of the iris is about 1 mm; and
the cavities have radiused portions that are fully radiused.

As discussed above, the depth De1 of the buncher cell cavity 1020a (3.32 mm) and the depths De4 of the following half-cell cavities 1062 (4.78 mm) are different. The buncher cell cavity iris diameter D2 (6.52 mm) is also different than the following half-cell iris diameters D5 (6.44 mm). The smaller iris diameters D5 of the half-cells 1060 provide wider modal separation. The accelerator 1000 is therefore less sensitive to thermal effects, decreasing problems during accelerator warm up, for example.

The Modules

The modules 102, 104, 108 protect the system components from dust, rain, and shock. The modules 102, 104, 108 may comprise stiff or flexible material. Each module may include recessed handles, recessed/protected vents, and/or recessed connectors with caps to protect contacts from dust. In one example, the modules 102, 104, 106 comprise polymers, such as polyurethane or glass filled polyethylene, which are durable, moldable, and lightweight. The modules 102, 104, 106 may be stackable.

As discussed above, components within a module, such as the third module 106, may be coupled to a strongback of material, as discussed above with respect to FIGS. 10a and 10b, to support and mechanically isolate the components and protect them from physical shock, movement, falling, etc. Aluminum may be used, for example. The strong back may be directly connected to the case or may be coupled to the case by elastomeric isolators 1250, such as springs or resilient material. In addition, the strong-back facilitates field testing, eases maintenance, and facilitates field replacement of the superstructure. The first and second modules 102, 104 may also include a strong back and elastomeric isolation, if desired. The strong back may be a rigid, lightweight material, such as aluminum.

Electromagnetic interference (EMI) shielding may be provided in any or all modules 102, 104, 106. EMI shielding may be provided by copper or silver paint, for example. EMI shielding may also be provided by vacuum deposited aluminum (VDA) on the inner and/or outer surface of the modules 102, 104, 106, for example. Integrally molded wire mesh may be provided in the vents or other such openings, for example.

Figure 12:
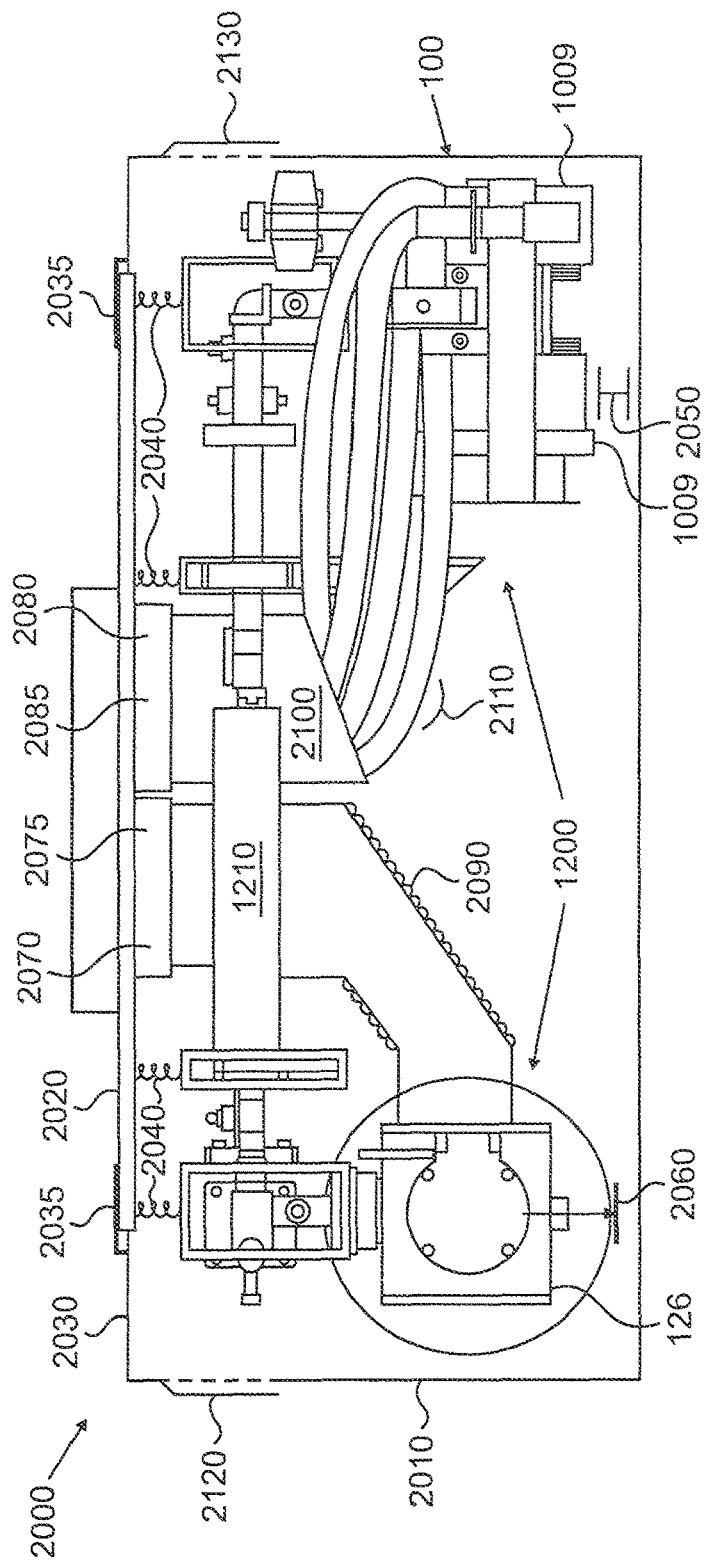
FIG. 12 is a sectional view of an example of the internal configuration of the X-ray head in the third module, including another strong back arrangement.

FIG. 12 is a cross-sectional view of another example of the internal configuration of the X-ray head 118 in the third module 106. In this example, the module 106 comprises a case 2010 of a lightweight, deformable material, such as plastic. An aluminum bar 2020 is attached to an upper wall 2030 of the case 2010. The bar may be about 3 inches (76 mm) wide and about ½ inches (12.7 mm) thick, for example. The aluminum bar 2020 may be clipped to the upper wall 2030 by clips 2035, for example. The accelerator 1000, magnetron 126, and other components of the X-ray head 118, are suspended from the aluminum bar 2020 by shock mounts, such as springs 2040. Double springs may be used to decrease swaying. The accelerator 1000 and the magnetron 126 are suspended such that there are clearances 2050, 2060 below the accelerator 122 and the magnetron 126, which allow for movement of these components within the case 2010 and deformation of the case 2010. A second, rigid aluminum bar may be provided between the springs and the first bar.

Figure 13:
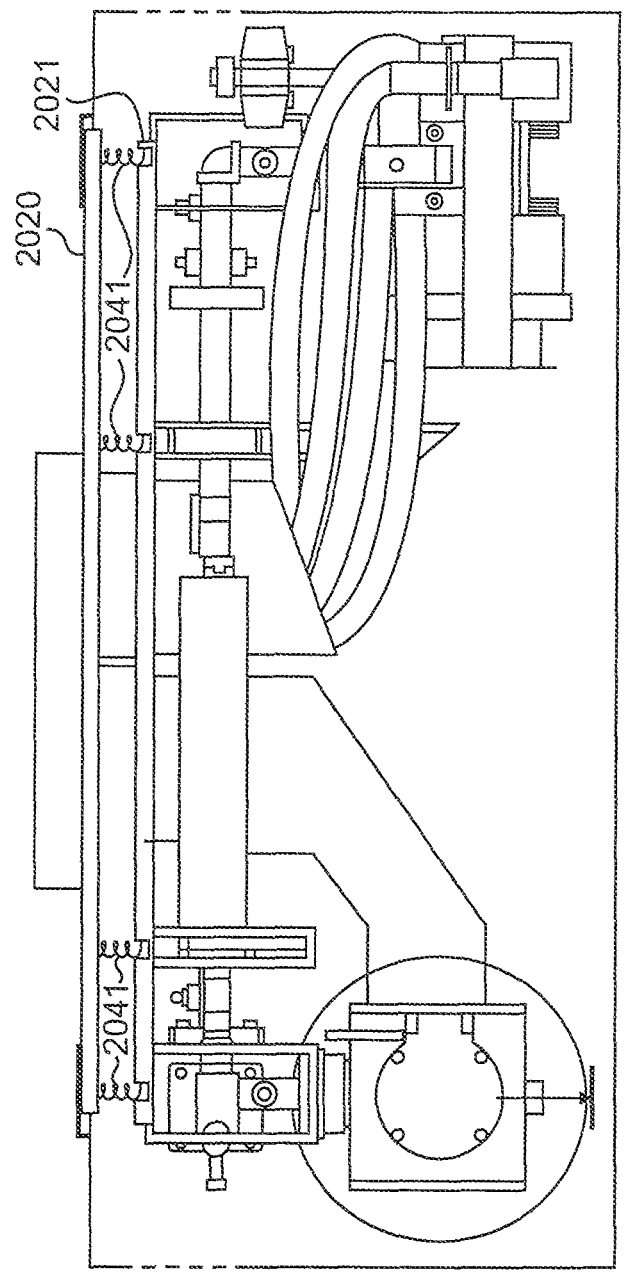
FIG. 13 is a sectional view of another example of the internal configuration of the X-ray head in the third module, including another strong back arrangement.

FIG. 13 is a cross-sectional view of another example of the internal configuration of the X-ray head 118 in the third module 106 that is similar to the view of FIG. 12, except that a second aluminum bar 2021 is provided, coupled to the first bar by springs 2041. The components of the X-ray head 118 are coupled to the second bar 2021.

Two fans 2070, 2080 are attached to the aluminum bar 2020 adjacent to the air inlet openings through the case 2010. A flexible duct 2090 extends from the fan 2070 to the magnetron 126, to provide cooling air to the magnetron. A flexible duct 2100 also extends from the fan 2070. Flexible tubes 2110 extend from the duct 2100 to various locations around the accelerator 1000, including to the cooling fin assemblies 1150a-1150d, to cool the accelerator body 1002. Guides, such as guides 1151 coupled to the cooling fin assemblies 1150a-1150d, are not provided in this configuration.

Air outlet openings 2120, 2130 are provided for air to flow out of the case 2000. A plastic rain cover may be provided over the openings 2075, 2085 to the fans 2070, 2080. Radio-frequency interference screens may be provided in the air openings 2120, 2130. The inner and electromagnetic radio-frequency shielding, as well.

The power/control cables 130/132 may be coupled to the case 2010 via a ruggedized connector, such as those provided by Caton Connector Corporation, Kingston, Mass.

One handle 2140 is provided in this example. The handle 2140 folds in when not in use.

As mentioned above, the case may also include louvered vents and/or fans for thermal control, as well. Hot and/or cold kits could also be provided.

The case 2000 may be used underwater by attaching a snorkel to the air openings outlets 2120, 2130, an inlet to attach an air tank hose to each air inlet opening 2075, 2085, for providing cooling air, and gaskets at the case tab. High voltage hold off with moisture may be provided by additional potting, if needed.

One of ordinary skill in the art will recognize that changes may be made to the embodiments described above without departing from the spirit and scope of the invention, which is defined by the claims below.

We claim:

1. A man-portable radiation generation system, comprising:
a first module comprising a first case and at least one battery within the first case;
a second module comprising a second case separate from the first case and a modulator within the second case, wherein the first and second modules are configured to be selectively electrically coupled to each other; and
a third module comprising a third case separate from the first and second cases and a charged particle accelerator within the third case, wherein the second and third modules are configured to be selectively electrically coupled to each other;
wherein:
the at least one battery provides power to the second module when the first, second, and third modules are electrically coupled; and
each of the modules is portable by hand by one or two people.

2. The man-portable radiation generation system of claim 1, wherein each module is portable by hand by one person.

3. The man-portable radiation generation system of claim 1, wherein the system weighs less than 300 pounds (136 kg).

4. The man-portable radiation generation system of claim 1, wherein the first module further comprises:
a controller to control operation of the source; and
a control device removably mounted to the first module, for remote control of the controller.

5. The man-portable radiation generation system of claim 4, wherein the first module further comprises:
a cable electrically coupling the control device to the controller, and a spool, around which the cable is selectively wound.

6. The man-portable radiation generation system of claim 1, wherein the third module further comprises:
an electron gun mounted to the accelerator, to inject electrons into the accelerator, wherein the electron gun is powered by the modulator;
a target coupled to the accelerator to generate X-ray radiation upon impact by accelerated electrons; and
a magnetron coupled to the accelerator to provide radiofrequency power to the accelerator, wherein the magnetron is powered by the modulator, and the modulator is powered by the at least one battery.

7. The man-portable radiation generation system of claim 1, wherein the third module further comprises a rigid support coupled to at least one inner wall of the third module; and
the accelerator is coupled to the support.

8. The man-portable radiation generation system of claim 7, wherein the support comprises:
a rigid plate connected to the at least one inner wall; and
at least one elastomeric member coupling the accelerator to the rigid plate.

9. The man-portable radiation generation system of claim 1, configured to generate radiation having a peak energy of from about 500 KeV to about 1 MeV.

10. The man-portable radiation generation system of claim 1, wherein at least one of the modules comprises a case having handles.

11. The man-portable radiation generation system of claim 1, wherein the accelerator further comprises:
a plurality of fins coupled to an exterior surface of the accelerator.

12. The man-portable radiation generation system of claim 1, wherein the first module further comprises:
an electrical plug for connection to an external power source.

13. The man-portable radiation generation system of claim 1, further comprising:
a detector.

14. The man-portable radiation generation system of claim 1, wherein the first, second, and third modules each weigh less than 100 pounds (34 kg).

15. A radiation generation source, comprising:
a case having at least one wall defining an air inlet therethrough;
a charged particle accelerator within the case;
a source of charged particles coupled to the accelerator to inject charged particles into the accelerator;
a target coupled to an output of the accelerator, wherein impact of the accelerated charged particles on the target causes generation of radiation; and
a plurality of fins coupled to an exterior surface of the accelerator, to air cool the accelerator;
a fan proximate the case opening to move air through the case; and
a guide to direct air into the first opening.

16. The radiation generation source of claim 15, further comprising:
a cover covering at least some of the plurality of fins, wherein the cover, the fins covered by the cover, and the exterior surface of the accelerator proximate the covered fins define a cooling manifold having a first opening for air to enter the cooling manifold and a second opening for air to exit the cooling manifold.

17. The radiation generation source of claim 16, further comprising:
a duct to convey air from the fan to the guide.

18. The radiation generation source of claim 17, wherein:
the guide is coupled to the manifold; and
the at least one wall further defines at least one air exhaust vent.

19. The radiation generation source of claim 15, wherein:
the charged particle accelerator is a linear charged particle accelerator; and
at least some of the plurality of fins are transverse to a long axis of the linear charged particle accelerator.

20. A battery operated radiation generation source, comprising:
at least one battery;
a charged particle accelerator;
a source of charged particles coupled to the accelerator to inject charged particles into the accelerator;
a target coupled to an output of the accelerator, wherein impact of the accelerated charged particles on the target causes generation of radiation; and
a radiofrequency power supply to provide radiofrequency power to the accelerator;
wherein the at least one battery provides power to the source of charged particles and the radiofrequency power supply.

21. The source of claim 20, further comprising:
a modulator coupled to the at least one battery, to convert direct current voltage from the battery to voltage pulses to be provided to the source of charged particles and to the radiofrequency power supply.

22. A charged particle acceleration system comprising:
a case having at least one exterior wall, the exterior wall having an inner surface defining an interior space of the case;
a charged particle accelerator within the interior space;
a rigid support connected to the at least one exterior wall of the case, the rigid support being at least partially within the interior space of the case; and
at least one elastomeric member connected to a portion of the rigid support within the interior space of the case;
wherein the at least one elastomeric member couples the charged particle accelerator to the rigid support,
the charged particle accelerator is suspended from the at least one elastomeric member at positions such that respective spaces are provided between the charged particle accelerator and the inner surface of the case, allowing for movement of the charged particle accelerator within the interior space of the case, and
the charged particle accelerator system is portable by hand by one or two people.

23. The charged particle acceleration system of claim 22, further comprising:
a second rigid support coupled to the first rigid support by the at least one elastomeric member;
wherein the accelerator is suspended from the at least one elastomeric member via the second rigid support.

24. The charged particle acceleration system of claim 22, further comprising:
a magnetron coupled to the charged particle accelerator within the case to provide radiofrequency power to the charged particle accelerator.

25. The charged particle acceleration system of claim 24, wherein the magnetron is suspended from the support, at positions such that respective spaces are provided between the charged particle accelerator and the magnetron, and between the charged particle accelerator, the magnetron, and the inner surface of the at least one exterior wall of the case, allowing for movement of the magnetron within the case.

26. The charged particle acceleration system of claim 22, further comprising:
a target within the case, positioned for impact by charged particles accelerated by the accelerator, to generate radiation.

27. The charged particle acceleration system of claim 22, wherein:
the at least one elastomeric member comprises at least one spring.

28. The charged particle acceleration system of claim 22, further comprising at least one handle for carrying the case.

* * * * *